(12) United States Patent
Moore et al.

(10) Patent No.: US 11,021,662 B2
(45) Date of Patent: *Jun. 1, 2021

(54) MULTI-STAGE PROCESS AND DEVICE UTILIZING STRUCTURED CATALYST BEDS AND REACTIVE DISTILLATION FOR THE PRODUCTION OF A LOW SULFUR HEAVY MARINE FUEL OIL

(71) Applicant: Magëmä Technology LLC, Houston, TX (US)

(72) Inventors: Michael Joseph Moore, Houston, TX (US); Bertrand Ray Klussmann, Houston, TX (US); Carter James White, Houston, TX (US)

(73) Assignee: Magëmä Technology LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,485

(22) Filed: Dec. 18, 2019

(65) Prior Publication Data
US 2020/0140765 A1    May 7, 2020

Related U.S. Application Data

(63) Continuation of application No. 16/103,896, filed on Aug. 14, 2018, now Pat. No. 10,836,966, which is a
(Continued)

(51) Int. Cl.
*C10G 45/04* (2006.01)
*C10G 7/00* (2006.01)
(Continued)

(52) U.S. Cl.
CPC ............ *C10G 45/04* (2013.01); *B01D 3/343* (2013.01); *B01D 53/1481* (2013.01); *B01J 8/008* (2013.01); *B01J 8/0278* (2013.01); *B01J 8/0292* (2013.01); *B01J 8/0457* (2013.01); *B01J 8/0492* (2013.01); *B01J 21/04* (2013.01);
(Continued)

(58) Field of Classification Search
None
See application file for complete search history.

(56) References Cited

U.S. PATENT DOCUMENTS 3,259,587 A * 7/1966 Dickson ............... C10G 33/04
516/148
3,567,824 A * 3/1971 Moore .................. A01N 25/02
514/144
(Continued)

*Primary Examiner* — Tam M Nguyen
(74) *Attorney, Agent, or Firm* — Carter J White

(57) ABSTRACT

A multi-stage process for the production of an ISO8217 compliant Product Heavy Marine Fuel Oil from ISO 8217 compliant Feedstock Heavy Marine Fuel Oil involving a core process under reactive conditions in a Reaction System composed of one or more reaction vessels, wherein one or more of the reaction vessels contains one or more catalysts in the form of a structured catalyst bed and is operated under reactive distillation conditions. The Product Heavy Marine Fuel Oil has a sulfur level has a maximum sulfur content (ISO 14596 or ISO 8754) between the range of 0.05 mass % to 1.0 mass. A process plant for conducting the process for conducting the process is disclosed.

19 Claims, 6 Drawing Sheets

Related U.S. Application Data continuation-in-part of application No. PCT/US2018/017863, filed on Feb. 12, 2018, and a continuation-in-part of application No. PCT/US2018/017855, filed on Feb. 12, 2018.

(60) Provisional application No. 62/589,479, filed on Nov. 21, 2017, provisional application No. 62/458,002, filed on Feb. 12, 2017.

(51) Int. Cl.
| | |
|---|---|
| *C10G 67/06* | (2006.01) |
| *C10G 45/22* | (2006.01) |
| *C10G 45/08* | (2006.01) |
| *C10G 25/02* | (2006.01) |
| *C10G 25/00* | (2006.01) |
| *B01D 3/34* | (2006.01) |
| *B01J 8/04* | (2006.01) |
| *B01D 53/14* | (2006.01) |
| *C10G 45/06* | (2006.01) |
| *C10L 1/04* | (2006.01) |
| *C10G 45/02* | (2006.01) |
| *C10G 67/02* | (2006.01) |
| *B01J 8/00* | (2006.01) |
| *B01J 21/04* | (2006.01) |
| *B01J 23/24* | (2006.01) |
| *B01J 23/40* | (2006.01) |
| *B01J 23/74* | (2006.01) |
| *C10G 65/16* | (2006.01) |
| *B01J 8/02* | (2006.01) |
| *C10G 47/02* | (2006.01) |
| *C10G 69/02* | (2006.01) |

(52) U.S. Cl.
CPC ............... *B01J 23/24* (2013.01); *B01J 23/40* (2013.01); *B01J 23/74* (2013.01); *C10G 7/00* (2013.01); *C10G 25/003* (2013.01); *C10G 25/02* (2013.01); *C10G 45/02* (2013.01); *C10G 45/06* (2013.01); *C10G 45/08* (2013.01); *C10G 45/22* (2013.01); *C10G 47/02* (2013.01); *C10G 65/16* (2013.01); *C10G 67/02* (2013.01); *C10G 67/06* (2013.01); *C10G 69/02* (2013.01); *C10L 1/04* (2013.01); *B01J 2208/00557* (2013.01); *B01J 2208/02* (2013.01); *B01J 2208/025* (2013.01); *C10G 2300/1037* (2013.01); *C10G 2300/1044* (2013.01); *C10G 2300/1048* (2013.01); *C10G 2300/1059* (2013.01); *C10G 2300/201* (2013.01); *C10G 2300/202* (2013.01); *C10G 2300/205* (2013.01); *C10G 2300/206* (2013.01); *C10G 2300/207* (2013.01); *C10G 2300/208* (2013.01); *C10G 2300/30* (2013.01); *C10G 2300/302* (2013.01); *C10G 2300/308* (2013.01); *C10G 2300/4012* (2013.01); *C10G 2300/4018* (2013.01); *C10G 2300/4062* (2013.01); *C10G 2300/70* (2013.01); *C10G 2300/80* (2013.01); *C10G 2400/04* (2013.01); *C10G 2400/06* (2013.01); *C10L 2200/0263* (2013.01); *C10L 2200/0438* (2013.01); *C10L 2270/02* (2013.01); *C10L 2270/026* (2013.01)

(56) References Cited

U.S. PATENT DOCUMENTS

| | | | | |
|---|---|---|---|---|
| 5,348,710 | A * | 9/1994 | Johnson | B01J 8/02 |
| | | | | 422/211 |
| 5,837,130 | A * | 11/1998 | Crossland | C10G 65/16 |
| | | | | 208/213 |
| 10,899,983 | B1 * | 1/2021 | Kar | C10L 1/08 |

* cited by examiner

MULTI-STAGE PROCESS AND DEVICE UTILIZING STRUCTURED CATALYST BEDS AND REACTIVE DISTILLATION FOR THE PRODUCTION OF A LOW SULFUR HEAVY MARINE FUEL OIL

BACKGROUND

There are two basic marine fuel types: distillate based marine fuel, also known as Marine Gas Oil (MGO) or Marine Diesel Oil (MDO); and residual based marine fuel, also known as heavy marine fuel oil (HMFO). Distillate based marine fuel both MGO and MDO, comprises petroleum middle distillate fractions separated from crude oil in a refinery via a distillation process. Gasoil (also known as medium diesel) is a petroleum middle distillate in boiling range and viscosity between kerosene (light distillate) and lubricating oil (heavy distillate) containing a mixture of C10 to C19 hydrocarbons. Gasoil (a heavy distillate) is used to heat homes and is used blending with lighter middle distillates as a fuel for heavy equipment such as cranes, bulldozers, generators, bobcats, tractors and combine harvesters. Generally maximizing middle distillate recovery from heavy distillates mixed with petroleum residues is the most economic use of these materials by refiners because they can crack gas oils into valuable gasoline and distillates in a fluid catalytic cracking (FCC) unit. Diesel oils for road use are very similar to gas oils with road use diesel containing predominantly contain a middle distillate mixture of C10 through C19 hydrocarbons, which include approximately 64% aliphatic hydrocarbons, 1-2% olefinic hydrocarbons, and 35% aromatic hydrocarbons. Distillate based marine fuels (MDO and MGO) are essentially road diesel or gas oil fractions blended with up to 15% residual process streams, and optionally up to 5% volume of polycyclic aromatic hydrocarbons (asphaltenes). The residual and asphaltene materials are blended into the middle distillate to form MDO and MGO as a way to both swell volume and productively use these low value materials.

Asphaltenes are large and complex polycyclic hydrocarbons with a propensity to form complex and waxy precipitates, especially in the presence of aliphatic (paraffinic) hydrocarbons that are the primary component of Marine Diesel. Once asphaltenes have precipitated out, they are notoriously difficult to re-dissolve and are described as fuel tank sludge in the marine shipping industry and marine bunker fueling industry. One of skill in the art will appreciate that mixing Marine Diesel with asphaltenes and process residues is limited by the compatibility of the materials and formation of asphaltene precipitates and the minimum Cetane number required for such fuels.

Residual based fuels or Heavy Marine Fuel Oil (HMFO) are used by large ocean-going ships as fuel for large two stroke diesel engines for over 50 years. HMFO is a blend of the residues generated throughout the crude oil refinery process. Typical refinery streams combined to from HMFO may include, but are not limited to: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil, heavy gas oils and delayed cracker oil (DCO), deasphalted oils (DAO); heavy aromatic residues and mixtures of polycylic aromatic hydrocarbons, reclaimed land transport motor oils; pyrolysis oils and tars; aspahltene solids and tars; and minor portions (often less than 20% vol.) of middle distillate materials such as cutter oil, kerosene or diesel to achieve a desired viscosity. HMFO has a higher aromatic content (especially polynuclear aromatics and asphaltenes) than the marine distillate fuels noted above. The HMFO component mixture varies widely depending upon the crude slate (i.e. source of crude oil) processed by a refinery and the processes utilized within that refinery to extract the most value out of a barrel of crude oil. The HMFO is generally characterized as being highly viscous, high in sulfur and metal content (up to 5 wt %), and high in asphaltenes making HMFO the one product of the refining process that has historically had a per barrel value less than feedstock crude oil.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global marine air pollution and local marine air pollution levels.

The International Convention for the Prevention of Pollution from Ships, also known as the MARPOL convention or just MARPOL, as administered by the International Maritime Organization (IMO) was enacted to prevent marine pollution (i.e. marpol) from ships. In 1997, a new annex was added to the MARPOL convention; the Regulations for the Prevention of Air Pollution from Ships—Annex VI to minimize airborne emissions from ships ($SO_x$, $NO_x$, ODS, VOC) and their contribution to global air pollution. A revised Annex VI with tightened emissions limits was adopted in October 2008 and effective 1 Jul. 2010 (hereafter called Annex VI (revised) or simply Annex VI).

MARPOL Annex VI (revised) adopted in 2008 established a set of stringent air emissions limits for all vessel and designated Emission Control Areas (ECAs). The ECAs under MARPOL Annex VI are: i) Baltic Sea area—as defined in Annex I of MARPOL—$SO_x$ only; ii) North Sea area—as defined in Annex V of MARPOL—$SO_x$ only; iii) North American—as defined in Appendix VII of Annex VI of MARPOL—$SO_x$, $NO_x$ and PM; and, iv) United States Caribbean Sea area—as defined in Appendix VII of Annex VI of MARPOL—$SO_x$, $NO_x$ and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of Annex VI. See 40 C.F.R. § 1043.100(a)(1). On Aug. 1, 2012 the maximum sulfur content of all marine fuel oils used onboard ships operating in US waters/ECA was reduced from 3.5% wt. to 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare to comply with the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For over five years there has been a very strong economic incentive to meet the marine industry demands for low sulfur HMFO, however technically viable solutions have not been realized and a premium price has been commanded by refiners to supply a low sulfur HMFO compliant with Annex VI sulfur emissions requirements in the ECA areas.

Since enactment in 2010, the global sulfur cap for HMFO outside of the ECA areas was set by Annex VI at 3.50% wt. effective 1 Jan. 2012; with a further reduction to 0.50% wt, effective 1 Jan. 2020. The global cap on sulfur content in HMFO has been the subject of much discussion in both the marine shipping and marine fuel bunkering industry. There has been and continues to be a very strong economic incentive to meet the international marine industry demands for low sulfur HMFO (i.e. HMFO with a sulfur content less than 0.50 wt. %. Notwithstanding this global demand, solutions for transforming high sulfur HMFO into low sulfur HMFO have not been realized or brought to market. There is an on-going and urgent demand for processes and methods for making a low sulfur HMFO compliant with MARPOL Annex VI emissions requirements.

Replacement of heavy marine fuel oil with marine gas oil or marine diesel: One primary solution to the demand for low sulfur HMFO to simply replace high sulfur HMFO with marine gas oil (MGO) or marine diesel (MDO). The first major difficulty is the constraint in global supply of middle distillate materials that make up 85-90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of MGO, but they have no economic motivation because higher value and higher margins can be obtained from using middle distillate fractions for low sulfur diesel fuel for land-based transportation systems (i.e. trucks, trains, mass transit systems, heavy construction equipment, etc.).

Blending: Another primary solution is the blending of high sulfur HMFO with lower sulfur containing fuels such as MGO or MDO low sulfur marine diesel (0.1% wt. sulfur) to achieve a Product HMFO with a sulfur content of 0.5% wt. In a straight blending approach (based on linear blending) every 1 ton of high sulfur HSFO (3.5% sulfur) requires 7.5 tons of MGO or MDO material with 0.1% wt. S to achieve a sulfur level of 0.5% wt. HMFO. One of skill in the art of fuel blending will immediately understand that blending hurts key properties of the HMFO, specifically lubricity, fuel density, CCAI, viscosity, flash point and other important physical bulk properties. Blending a mostly paraffinic-type distillate fuel (MGO or MDO) with a HMFO having a high poly aromatic content often correlates with poor solubility of asphaltenes. A blended fuel is likely to result in the precipitation of asphaltenes and/or waxing out of highly paraffinic materials from the distillate material forming an intractable fuel tank sludge. Fuel tank sludge causes clogging of filters and separators, transfer pumps and lines, build-up of sludge in storage tanks, sticking of fuel injection pumps, and plugged fuel nozzles. Such a risk to the primary propulsion system is not acceptable for a ship in the open ocean.

It should further be noted that blending of HMFO with marine distillate products (MGO or MDO) is not economically viable. A blender will be taking a high value product (0.1% S marine gas oil (MGO) or marine diesel (MDO)) and blending it 7.5 to 1 with a low value high sulfur HMFO to create a final IMO/MARPOL compliant HMFO (i.e. 0.5% wt. S Low Sulfur Heavy Marine Fuel Oil—LSHMFO) which will sell at a discount to the value of the principle ingredient (i.e. MGO or MDO).

Processing of residual oils. For the past several decades, the focus of refining industry research efforts related to the processing of heavy oils (crude oils, distressed oils, or residual oils) has been on upgrading the properties of these low value refinery process oils to create middle distillate and lighter oils with greater value. The challenge has been that crude oil, distressed oil and residues contain high levels of sulfur, nitrogen, phosphorous, metals (especially vanadium and nickel); asphaltenes and exhibit a propensity to form carbon or coke on the catalyst. The sulfur and nitrogen molecules are highly refractory and aromatically stable and difficult and expensive to crack or remove. Vanadium and nickel porphyrins and other metal organic compounds are responsible for catalyst contamination and corrosion problems in the refinery. The sulfur, nitrogen, and phosphorous, must be removed because they are well-known poisons for the precious metal (platinum and palladium) catalysts utilized in the processes downstream of the atmospheric or vacuum distillation towers.

The difficulties treating atmospheric or vacuum residual streams has been known for many years and has been the subject of considerable research and investigation. Numerous residue-oil conversion processes have been developed in which the goals are same: 1) create a more valuable, preferably middle distillate range hydrocarbons; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst life times and remove sulfur, nitrogen, phosphorous, metals and asphaltenes from the refinery stream.

In summary, since the announcement of the MARPOL Annex VI standards reducing the global levels of sulfur in HMFO, refiners of crude oil have had modest success in their technical efforts to create a process for the production of a low sulfur substitute for high sulfur HMFO. Despite the strong governmental and economic incentives and needs of the international marine shipping industry, refiners have little economic reason to address the removal of environmental contaminates from high sulfur HMFOs. The global refining industry has been focused upon generating greater value from each barrel of oil by creating middle distillate hydrocarbons (i.e. diesel) and concentrating the environmental contaminates into increasingly lower value streams (i.e. residues) and products (petroleum coke, HMFO). Shipping companies have focused on short term solutions, such as the installation of scrubbing units, or adopting the limited use of more expensive low sulfur marine diesel and marine gas oils as a substitute for HMFO. On the open seas, most if not all major shipping companies continue to utilize the most economically viable fuel, that is HMFO. There remains a long standing and unmet need for processes and devices that remove the environmental contaminants (i.e. sulfur, nitrogen, phosphorous, metals especially vanadium and nickel) from HMFO without altering the qualities and properties that make HMFO the most economic and practical means of powering ocean going vessels.

SUMMARY

It is a general objective to process a high sulfur Feedstock Heavy Marine Fuel Oil (HMFO) in a multi stage process that minimizes the changes in the desirable properties of the HMFO and minimizes the production of by-product hydrocarbons (i.e. light hydrocarbons having $C_1$-$C_4$ and wild naphtha ($C_5$-$C_{20}$)) but reduces the sulfur and other environmental contaminates present in the Feedstock HMFO.

A first aspect and illustrative embodiment encompasses a multi-stage process for the production of a low sulfur Product Heavy Marine Fuel Oil, the process involving: mixing a quantity of the Feedstock Heavy Marine Fuel Oil with a quantity of Activating Gas mixture to give a Feedstock Mixture; contacting the Feedstock Mixture with one or more catalysts in a Reaction System under reactive distillation conditions to form a Process Mixture from the Feedstock Mixture, wherein the one or more catalysts are in a structured catalyst bed; receiving the Process Mixture and separating the Product Heavy Marine Fuel Oil liquid components of the Process Mixture from the gaseous components and by-product hydrocarbon components of the Process Mixture and, discharging the Product Heavy Marine Fuel Oil. In a preferred embodiment, the Reaction System comprises two or more reactor vessel wherein one or more of the reactor vessels contains a structured catalyst bed. In one embodiment, the structured catalyst bed comprises a plurality of catalyst retention structures, each catalyst retention structure composed of a pair of fluid permeable corrugated metal sheets, wherein the pair of the fluid permeable corrugated metal sheets are aligned so the corrugations are out of phase and defining a catalyst rich space and a catalyst lean space within the structured catalyst bed, wherein within the catalyst rich space there is one or more catalyst materials and optionally inert packing materials. Another alternative and embodiment the structured catalyst bed contains one or more catalysts to promote the transformation of the Feedstock mixture to a Process Mixture wherein the structured catalyst bed comprises a plurality of catalyst retention structures, each catalyst retention structure composed of a pair of fluid permeable corrugated metal sheets, wherein the pair of the fluid permeable corrugated metal sheets are aligned so the corrugations are out of phase and defining a catalyst rich space and a catalyst lean space within the structured catalyst bed, wherein within the catalyst rich space there is one or more catalyst materials and optionally inert packing materials.

A second aspect and illustrative embodiment encompasses a device or plant for the production of a Product HMFO. The illustrative devices embody the above illustrative processes on a commercial scale. Such devices include the use of multiple reactor vessels forming a Reactor System in which one or more of the reactor vessels operates under reactive distillation conditions and contains a structured catalyst bed.

A third aspect and illustrative embodiment encompasses a reaction vessel containing one or more structured catalyst beds and configured to operate under reactive distillation conditions so at least 50% and preferably at least 75% and more preferably at least 90% of the desired reaction products are residual in character and exit the lower portion of the reactor vessel.

DETAILED DESCRIPTION

Figure 1:
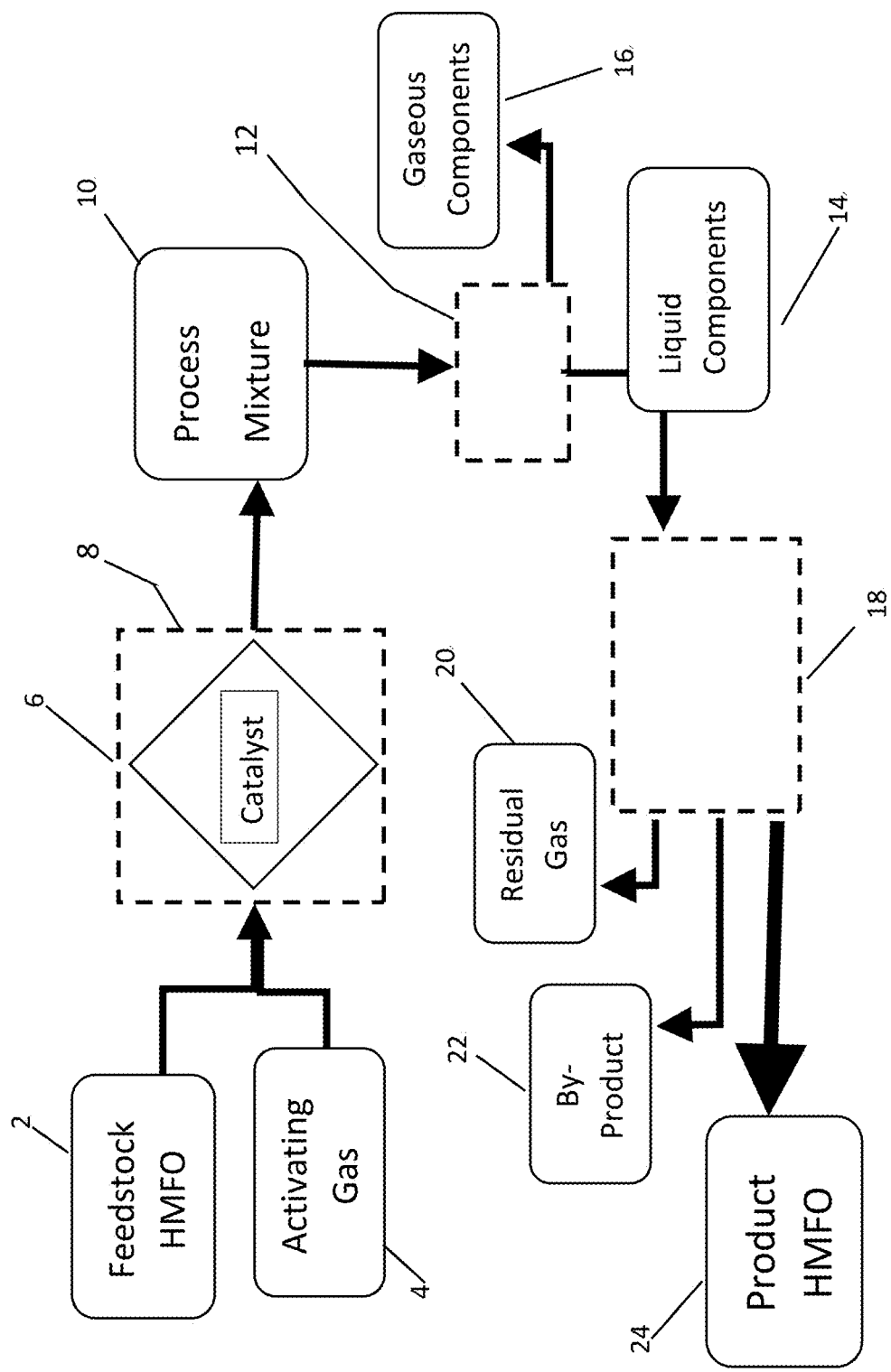
FIG. 1 is a process block flow diagram of an illustrative core process to produce Product HMFO.

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217 (2017) standards for residual marine fuels except for the concentration levels of the Environmental Contaminates.

Environmental Contaminates are organic and inorganic components of HMFO that result in the formation of $SO_x$, $NO_x$ and particulate materials upon combustion.

Feedstock HMFO is a petroleum product fuel compliant with the ISO 8217 (2017) standards for the physical properties or characteristics of a merchantable HMFO except for the concentration of Environmental Contaminates, more specifically the Feedstock HMFO has a sulfur content greater than the global MARPOL Annex VI standard of 0.5% wt. sulfur, and preferably and has a sulfur content (ISO 14596 or ISO 8754) between the range of 5.0% wt. to 1.0% wt.

Product HMFO is a petroleum product fuel compliant with the ISO 8217 (2017) standards for the physical properties or characteristics of a merchantable HMFO and has a sulfur content lower than the global MARPOL Annex VI standard of 0.5% wt. sulfur (ISO 14596 or ISO 8754), and preferably a maximum sulfur content (ISO 14596 or ISO 8754) between the range of 0.05% wt. to 1.0% wt.

Activating Gas: is a mixture of gases utilized in the process combined with the catalyst to remove the environmental contaminates from the Feedstock HMFO.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel oil so the fuel is fit for the ordinary purpose it should serve (i.e. serve as a residual fuel source for a marine ship) and can be commercially sold as and is fungible and compatible with other heavy or residual marine bunker fuels.

Bbl or bbl: is a standard volumetric measure for oil; 1 bbl=0.1589873 m$^3$; or 1 bbl=158.9873 liters; or 1 bbl=42.00 US liquid gallons.

Bpd or bpd: is an abbreviation for Bbl per day.

SCF: is an abbreviation for standard cubic foot of a gas; a standard cubic foot (at 14.73 psi and 60° F.) equals 0.0283058557 standard cubic meters (at 101.325 kPa and 15° C.).

Bulk Properties: are broadly defined as the physical properties or characteristics of a merchantable HMFO as required by ISO 8217 (2017); and more specifically the measurements include: kinematic viscosity at 50° C. as determined by ISO 3104; density at 15° C. as determined by ISO 3675; CCAI value as determined by ISO 8217, ANNEX B; flash point as determined by ISO 2719; total sediment—aged as determined by ISO 10307-2; carbon residue—micro method as determined by ISO 10370; and also preferably aluminum plus silicon content as determined by ISO 10478.

The inventive concepts are illustrated in more detail in this description referring to the drawings, in which FIG. 1 shows the generalized block process flows for a core process of reducing the Environmental Contaminates in a Feedstock HMFO and producing a Product HMFO. A predetermined volume of Feedstock HMFO (2) is mixed with a predetermined quantity of Activating Gas (4) to give a Feedstock Mixture. The Feedstock HMFO utilized generally complies with the bulk physical and certain key chemical properties for a residual marine fuel oil otherwise compliant with ISO 8217 (2017) exclusive of the Environmental Contaminates. More particularly, when the Environmental Contaminate is sulfur, the concentration of sulfur in the Feedstock HMFO may be between the range of 5.0% wt. to 1.0% wt. The Feedstock HMFO should have bulk physical properties required of an ISO 8217 (2017) compliant HMFO. The Feedstock HMFO should exhibit the Bulk Properties of: a maximum of kinematic viscosity at 50° C. (ISO 3104) between the range from 180 mm$^2$/s to 700 mm$^2$/s; a maximum of density at 15° C. (ISO 3675) between the range of 991.0 kg/m$^3$ to 1010.0 kg/m$^3$; a CCAI in the range of 780 to 870; and a flash point (ISO 2719) no lower than 60° C. Properties of the Feedstock HMFO connected to the formation of particulate material (PM) include: a total sediment—aged (ISO 10307-2) less than 0.10% wt. and a carbon residue—micro method (ISO 10370) less than 20% wt. and preferably a aluminum plus silicon (ISO 10478) content of less than 60 mg/kg. Environmental Contaminates other than sulfur that may be present in the Feedstock HMFO over the ISO requirements may include vanadium, nickel, iron, aluminum and silicon substantially reduced by the process of the present invention. However, one of skill in the art will appreciate that the vanadium content serves as a general indicator of these other Environmental Contaminates. In one preferred embodiment the vanadium content is ISO compliant so the Feedstock HMFO has a maximum vanadium content (ISO 14597) between the range from 350 mg/kg to 450 ppm mg/kg.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen ($p_{H2}$) greater than 90% of the total pressure of the Activating Gas mixture (P) and more preferably wherein the Activating Gas has an ideal gas partial pressure of hydrogen ($p_{H2}$) greater than 95% of the total pressure of the Activating Gas mixture (P). It will be appreciated by one of skill in the art that the molar content of the Activating Gas is another criterion the Activating Gas should have a hydrogen mole fraction in the range between 80% and 100% of the total moles of Activating Gas mixture.

The Feedstock Mixture (i.e. mixture of Feedstock HMFO and Activating Gas) is brought up to the process reactive conditions of temperature and pressure and introduced into a Reactor System, preferably a reactor vessel, so the Feedstock Mixture is then contacted under reactive conditions with one or more catalysts (8) to form a Process Mixture from the Feedstock Mixture.

The core process reactive conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl of Feedstock HMFO 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig. The process reactive conditions are selected so the indicated temperature within the first vessel is between of 500° F. to 900° F., preferably between 650° F. and 850° F. and more preferably between 680° F. and 800° F. The process conditions are selected so the liquid hourly space velocity within the first vessel is between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst; and more preferably between 0.1 oil/hour/m$^3$ catalyst and 0.3 oil/hour/m$^3$ catalyst to achieve deep desulfurization with product sulfur levels below 0.1 ppmw.

One of skill in the art will appreciate that the core process reactive conditions are determined considering the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day.

The transition metal heterogeneous catalyst utilized comprises a porous inorganic oxide catalyst carrier and a transition metal catalytic metal. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal catalytic metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo. The process by which the transition metal heterogeneous catalyst is manufactured is known in the literature and preferably the catalysts are commercially available as hydrodemetallization catalysts, transition catalysts, desulfurization catalyst and combinations of these which might be pre-sulfided. The transition metal heterogeneous catalyst is part of a structured catalyst bed in which the catalyst particles are distributed within an otherwise inert supporting structure to achieve an optimized balance between catalyst activity per unit volume and the linear space velocity of the Feedstock Mixture. This is described in greater detail below in relation to the structured catalyst bed configuration itself.

The Process Mixture (10) in this core process is removed from the Reactor System (8) and from being in contact with the one or more catalyst and is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas components and lighter hydrocarbons (mostly methane, ethane and propane but some wild naphtha) that may have been formed as part of the by-product hydrocarbons from the process.

The Liquid Components (16) in this core process are sent via fluid communication to a third vessel (18), preferably a fuel oil product stripper system, for separating any residual gaseous components (20) and by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, $C_1$-$C_5$ hydrocarbons. This residual gas is treated outside of the battery limits of the immediate process, combined with other gaseous components (16) removed from the Process Mixture (10) in the second vessel (12). The liquid by-product hydrocarbon component, which are condensable hydrocarbons formed in the process (22) may be a mixture selected from the group consisting of $C_5$-$C_{20}$ hydrocarbons (wild naphtha) (naphtha—diesel) and other condensable light liquid ($C_3$-$C_8$) hydrocarbons that can be utilized as part of the motor fuel blending pool or sold as gasoline and diesel blending components on the open market. We also assume a second draw (not shown) may be included to withdraw a distillate product, preferably a middle to heavy distillate. These liquid by-product hydrocarbons should be less than 15% wt., preferably less than 5% wt. and more preferably less than 3% wt. of the overall process mass balance.

The Product HMFO (24) resulting from the core process is discharged via fluid communication into storage tanks beyond the battery limits of the immediate process. The Product HMFO complies with ISO 8217 (2017) and has a maximum sulfur content (ISO 14596 or ISO 8754) between the range of 0.05 mass % to 1.0 mass % preferably a sulfur content (ISO 14596 or ISO 8754) between the range of 0.05 mass % ppm and 0.7 mass % and more preferably a sulfur content (ISO 14596 or ISO 8754) between the range of 0.1 mass % and 0.5 mass %. The vanadium content of the Product HMFO is also ISO compliant with a maximum vanadium content (ISO 14597) between the range from 350 mg/kg to 450 ppm mg/kg, preferably a vanadium content (ISO 14597) between the range of 200 mg/kg and 300 mg/kg and more preferably a vanadium content (ISO 14597) between the range of 50 mg/kg and 100 mg/kg.

The Product HFMO should have bulk physical properties that are ISO 8217 (2017) compliant. The Product HMFO should exhibit Bulk Properties of: a maximum of kinematic viscosity at 50° C. (ISO 3104) between the range from 180 mm$^2$/s to 700 mm$^2$/s; a maximum of density at 15° C. (ISO 3675) between the range of 991.0 kg/m$^3$ to 1010.0 kg/m$^3$; a CCAI value in the range of 780 to 870; a flash point (ISO 2719) no lower than 60.0° C.; a total sediment—aged (ISO 10307-2) of less than 0.10 mass %; a carbon residue—micro method (ISO 10370) lower than 20 mass %, and also preferably an aluminum plus silicon (ISO 10478) content of less than 60 mg/kg.

Relative the Feedstock HMFO, the Product HMFO will have a sulfur content (ISO 14596 or ISO 8754) between 1% and 20% of the maximum sulfur content of the Feedstock HMFO. That is the sulfur content of the Product will be reduced by about 80% or greater when compared to the Feedstock HMFO. Similarly, the vanadium content (ISO 14597) of the Product HMFO is between 1% and 20% of the maximum vanadium content of the Feedstock HMFO. One of skill in the art will appreciate that the above data indicates a substantial reduction in sulfur and vanadium content indicate a process having achieved a substantial reduction in the Environmental Contaminates from the Feedstock HMFO while maintaining the desirable properties of an ISO 8217 compliant and merchantable HMFO.

As a side note, the residual gaseous component is a mixture of gases selected from the group consisting of: nitrogen, hydrogen, carbon dioxide, hydrogen sulfide, gaseous water, $C_1$-$C_5$ hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydrosulfuric acid. Either way, the sulfur is removed from entering the environment prior to combusting the HMFO in a ships engine. The cleaned gas can be vented, flared or more preferably recycled back for use as Activating Gas.

Product HMFO The Product HFMO resulting from the disclosed illustrative process is of merchantable quality for sale and use as a heavy marine fuel oil (also known as a residual marine fuel oil or heavy bunker fuel) and exhibits the bulk physical properties required for the Product HMFO to be an ISO compliant (i.e. ISO 8217 (2017)) residual marine fuel oil. The Product HMFO should exhibit the Bulk Properties of: a maximum of kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI is in the range of 780 to 870; a flash point (ISO 2719) no lower than 60° C.; a total sediment—aged (ISO 10307-2) less than 0.10% wt.; and a carbon residue—micro method (ISO 10370) less than 20% wt.; and also preferably an aluminum plus silicon (ISO 10478) content no more than of 60 mg/kg.

The Product HMFO has a sulfur content (ISO 14596 or ISO 8754) less than 0.5 wt % and preferably less than 0.1% wt. and complies with the IMO Annex VI (revised) requirements for a low sulfur and preferably an ultra-low sulfur HMFO. That is the sulfur content of the Product HMFO has been reduced by about 80% or greater when compared to the Feedstock HMFO. Similarly, the vanadium content (ISO 14597) of the Product Heavy Marine Fuel Oil is less than 20% and more preferably less than 10% of the maximum vanadium content of the Feedstock Heavy Marine Fuel Oil. One of skill in the art will appreciate that a substantial reduction in sulfur and vanadium content of the Feedstock HMFO indicates a process having achieved a substantial reduction in the Environmental Contaminates from the Feedstock HMFO; of equal importance is this has been achieved while maintaining the desirable properties of an ISO 8217 (2017) compliant HMFO.

The Product HMFO not only complies with ISO 8217 (2017) (and is merchantable as a residual marine fuel oil or bunker fuel), the Product HMFO has a maximum sulfur content (ISO 14596 or ISO 8754) between the range of 0.05% wt. to 1.0% wt. preferably a sulfur content (ISO 14596 or ISO 8754) between the range of 0.05% wt. ppm and 0.5% wt. and more preferably a sulfur content (ISO 14596 or ISO 8754) between the range of 0.1% wt. and 0.5% wt. The vanadium content of the Product HMFO is well within the maximum vanadium content (ISO 14597) required for an ISO 8217 (2017) residual marine fuel oil exhibiting a vanadium content lower than 450 ppm mg/kg, preferably a vanadium content (ISO 14597) lower than 300 mg/kg and more preferably a vanadium content (ISO 14597) less than 50 mg/kg.

One knowledgeable in the art of marine fuel blending, bunker fuel formulations and the fuel requirements for marine shipping fuels will readily appreciate that without further compositional changes or blending, the Product HMFO can be sold and used as a low sulfur MARPOL Annex VI compliant heavy (residual) marine fuel oil that is a direct substitute for the high sulfur heavy (residual) marine fuel oil or heavy bunker fuel currently in use. One illustrative embodiment is an ISO 8217 (2017) compliant low sulfur heavy marine fuel oil comprising (and preferably consisting essentially of) hydroprocessed ISO 8217 (2017) compliant high sulfur heavy marine fuel oil, wherein the sulfur levels of the hydroprocessed ISO 8217 (2017) compliant high sulfur heavy marine fuel oil is greater than 0.5% wt. and wherein the sulfur levels of the ISO 8217 (2017) compliant low sulfur heavy marine fuel oil is less than 0.5% wt. Another illustrative embodiment is an ISO 8217 (2017) compliant ultra-low sulfur heavy marine fuel oil comprising (and preferably consisting essentially of) a hydroprocessed ISO 8217 (2017) compliant high sulfur heavy marine fuel oil, wherein the sulfur levels of the hydroprocessed ISO 8217 (2017) compliant high sulfur heavy marine fuel oil is greater than 0.5% wt. and wherein the sulfur levels of the ISO 8217 (2017) compliant low sulfur heavy marine fuel oil is less than 0.1% wt.

Because of the present invention, multiple economic and logistical benefits to the bunkering and marine shipping industries can be realized. The benefits include minimal changes to the existing heavy marine fuel bunkering infrastructure (storage and transferring systems); minimal changes to shipboard systems are needed to comply with emissions requirements of MARPOL Annex VI (revised); no additional training or certifications for crew members will be needed, amongst the realizable benefits. Refiners will also realize multiple economic and logistical benefits, including: no need to alter or rebalance the refinery operations, crude slate, and product streams to meet a new market demand for low sulfur or ultralow sulfur HMFO; no additional units are needed in the refinery with additional hydrogen or sulfur capacity because the illustrative process can be conducted as a stand-alone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for HMFO products.

Heavy Marine Fuel Composition One aspect of the present inventive concept is a fuel composition comprising, but preferably consisting essentially of, the Product HMFO resulting from the processes disclosed, and may optionally include Diluent Materials. The Product HMFO itself complies with ISO 8217 (2017) and meets the global IMO Annex VI requirements for maximum sulfur content (ISO 14596 or ISO 8754). If ultra-low levels of sulfur are desired, the process of the present invention achieves this and one of skill in the art of marine fuel blending will appreciate that a low sulfur or ultra-low sulfur Product HMFO can be utilized as a primary blending stock to form a global IMO Annex VI compliant low sulfur Heavy Marine Fuel Composition. Such a low sulfur Heavy Marine Fuel Composition will comprise (and preferably consist essentially of): a) the Product HMFO and b) Diluent Materials. In one embodiment, the majority of the volume of the Heavy Marine Fuel Composition is the Product HMFO with the balance of materials being Diluent Materials. Preferably, the Heavy Maine Fuel Composition is at least 75% by volume, preferably at least 80% by volume, more preferably at least 90% by volume, and furthermore preferably at least 95% by volume Product HMFO with the balance being Diluent Materials.

Diluent Materials may be hydrocarbon or non-hydrocarbon based materials mixed into or combined with or added to, or solid particle materials suspended in, the Product HMFO. The Diluent Materials may intentionally or unintentionally alter the composition of the Product HMFO but not so the resulting mixture violates the ISO 8217 (2017) standards for residual marine fuels or fails to have a sulfur content lower than the global MARPOL standard of 0.5% wt. sulfur (ISO 14596 or ISO 8754). Examples of Diluent Materials considered hydrocarbon based materials include: Feedstock HMFO (i.e. high sulfur HMFO); distillate based fuels such as road diesel, gas oil, MGO or MDO; cutter oil (which is used in formulating residual marine fuel oils); renewable oils and fuels such as biodiesel, methanol, ethanol, and the like; synthetic hydrocarbons and oils based on gas to liquids technology such as Fischer-Tropsch derived oils, synthetic oils such as those based on polyethylene, polypropylene, dimer, trimer and poly butylene; refinery residues or other hydrocarbon oils such as atmospheric residue, vacuum residue, fluid catalytic cracker (FCC) slurry oil, FCC cycle oil, pyrolysis gasoil, cracked light gas oil (CLGO), cracked heavy gas oil (CHGO), light cycle oil (LCO), heavy cycle oil (HCO), thermally cracked residue, coker heavy distillate, bitumen, de-asphalted heavy oil, visbreaker residue, slop oils, asphaltinic oils; used or recycled motor oils; lube oil aromatic extracts and crude oils such as heavy crude oil, distressed crude oils and similar materials that might otherwise be sent to a hydrocracker or diverted into the blending pool for a prior art high sulfur heavy (residual) marine fuel oil. Examples of Diluent Materials considered non-hydrocarbon based materials include: residual water (i.e. water absorbed from the humidity in the air or water that is miscible or solubilized, sometimes as microemulsions, into the hydrocarbons of the Product HMFO), fuel additives which can include, but are not limited to detergents, viscosity modifiers, pour point depressants, lubricity modifiers, de-hazers (e.g. alkoxylated phenol formaldehyde polymers), antifoaming agents (e.g. polyether modified polysiloxanes); ignition improvers; anti rust agents (e.g. succinic acid ester derivatives); corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and mixtures of these. A third group of Diluent Materials may include suspended solids or fine particulate materials that are present because of the handling, storage and transport of the Product HMFO or the Heavy Marine Fuel Composition, including but not limited to: carbon or hydrocarbon solids (e.g. coke, graphitic solids, or micro-agglomerated asphaltenes), iron rust and other oxidative corrosion solids, fine bulk metal particles, paint or surface coating particles, plastic or polymeric or elastomer or rubber particles (e.g. resulting from the degradation of gaskets, valve parts, etc. . . . ), catalyst fines, ceramic or mineral particles, sand, clay, and other earthen particles, bacteria and other biologically generated solids, and mixtures of these that may be present as suspended particles, but otherwise don't detract from the merchantable quality of the Heavy Marine Fuel Composition as an ISO 8217 (2017) compliant heavy (residual) marine fuel.

The blend of Product HMFO and Diluent Materials must be of merchantable quality as a low sulfur heavy (residual) marine fuel. That is the blend must be suitable for the intended use as heavy marine bunker fuel and generally be fungible and compatible as a bunker fuel for ocean going ships. Preferably the Heavy Marine Fuel Composition must retain the bulk physical properties required of an ISO 8217 (2017) compliant residual marine fuel oil and a sulfur content lower than the global MARPOL standard of 0.5% wt. sulfur (ISO 14596 or ISO 8754) so that the material qualifies as MARPOL Annex VI Low Sulfur Heavy Marine Fuel Oil (LS-HMFO). The sulfur content of the Product HMFO can be lower than 0.5% wt. (i.e. below 0.1% wt sulfur (ISO 14596 or ISO 8754)) to qualify as a MARPOL Annex VI compliant Ultra-Low Sulfur Heavy Marine Fuel Oil (ULS-HMFO) and a Heavy Marine Fuel Composition likewise can be formulated to qualify as a MARPOL Annex VI compliant ULS-HMFO suitable for use as marine bunker fuel in the ECA zones. To qualify as an ISO 8217 (2017) qualified fuel, the Heavy Marine Fuel Composition of the present invention must meet those internationally accepted standards. The Bulk Properties of the Heavy Marine Fuel Composition should include: a maximum of kinematic viscosity at 50° C. (ISO 3104) between the range from 180 $mm^2/s$ to 700 $mm^2/s$; a density at 15° C. (ISO 3675) between the range of 991.0 $kg/m^3$ to 1010.0 $kg/m^3$; a CCAI is in the range of 780 to 870; a flash point (ISO 2719) no lower than 60° C.; a total sediment—aged (ISO 10307-2) less than 0.10% wt.; and a carbon residue—micro method (ISO 10370) less than 20% wt., and an aluminum plus silicon (ISO 10478) content no more than of 60 mg/kg.

Figure 2:
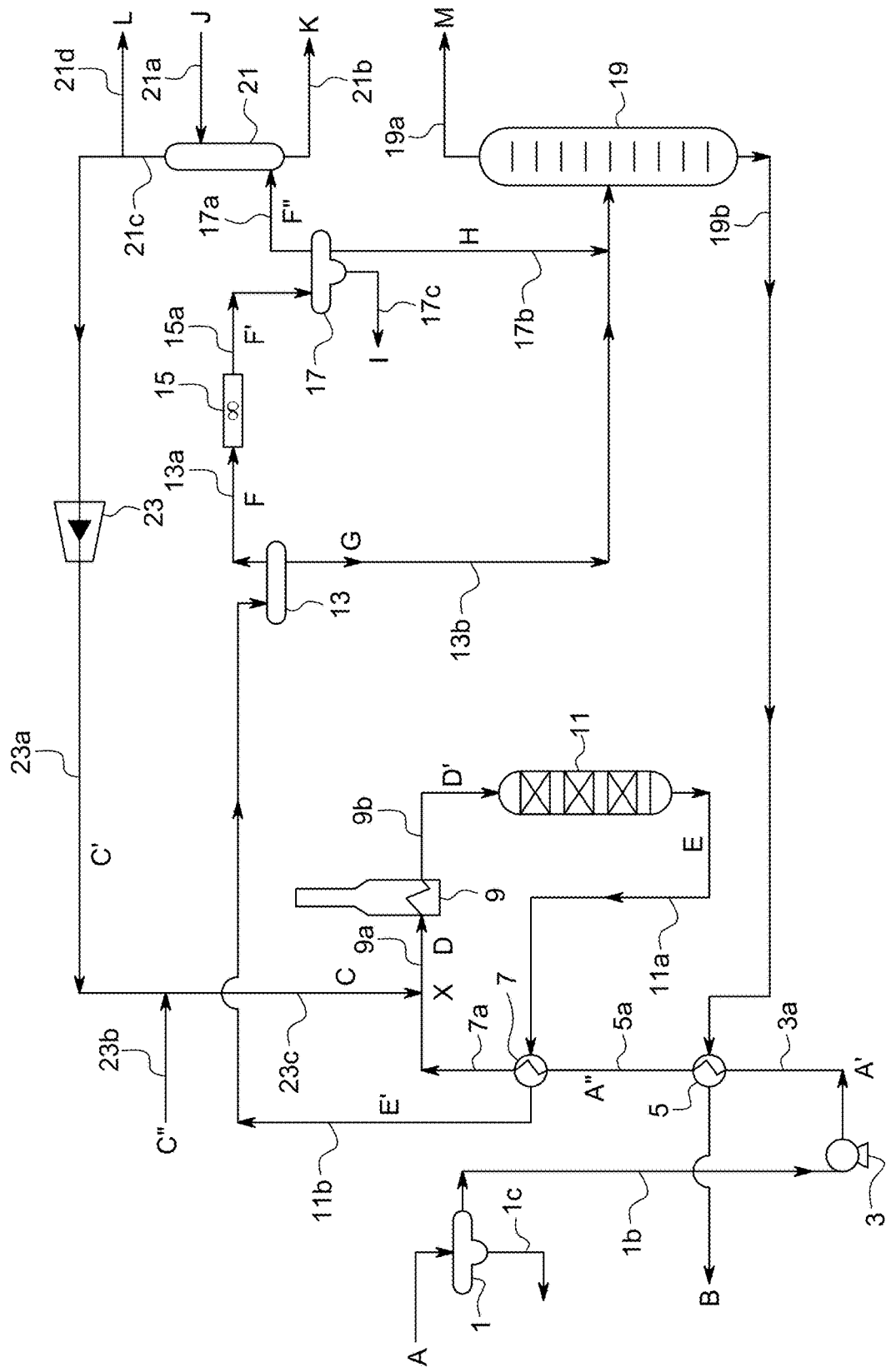
FIG. 2 is a process flow diagram of a multistage process for transforming the Feedstock HMFO and a subsequent core process to produce Product HMFO.

Production Plant Description Production Plant Description: Turning now to a more detailed illustrative embodiment of a production plant, FIG. 2 shows a schematic for a production plant implementing the process described above for reducing the environmental contaminates in a Feedstock HMFO to produce a Product HMFO according to the second illustrative embodiment. One of skill in the art will appreciate that FIG. 2 is a generalized schematic drawing, and the exact layout and configuration of a plant will depend upon factors such as location, production capacity, environmental conditions (i.e. wind load, etc.) and other factors and elements that a skilled detailed engineering firm can provide. Such variations are contemplated and within the scope of the present disclosure.

In FIG. 2, Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed and bulk solids (sand, rust particles, etc.) are removed from the HMFO with the water and bulk solids being discharged a stream (1c) for treatment OSBL.

The Feedstock HMFO (A) is withdrawn from the Oil Feed Surge Drum (1) via line (1b) by the Oil Feed Pump (3) and is pressurized to a pressure required for the process. The pressurized HMFO (A') then passes through line (3a) to the Oil Feed/Product Heat Exchanger (5) where the pressurized HMFO Feed (A') is partially heated by the Product HMFO (B). The pressurized Feedstock HMFO (A') passing through line (5a) is further heated against the effluent from the Reactor System (E) in the Reactor Feed/Effluent Heat Exchanger (7).

The heated and pressurized Feedstock HMFO (A") in line (7a) is then mixed with Activating Gas (C) provided via line (23c) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock Mixture (D) to the desired temperature for the process conditions.

The fully Heated Feedstock Mixture (D') exits the Reactor Feed Furnace (9) via line 9b and is fed into the Reactor System (11). The fully heated Feedstock Mixture (D') enters the Reactor System (11) where environmental contaminates, such a sulfur, nitrogen, and metals are preferentially removed from the Feedstock HMFO component of the fully heated Feedstock Mixture. The Reactor System contains a catalyst materials some or all of which many be within a structured catalyst bed, and which preferentially removes the Environmental Contaminates, principally organometal and organo sulfur compounds in the Feedstock HMFO component by reacting them with hydrogen in the Activating Gas to form deposits of metals, metal sulfides and/or hydrogen sulfide. The Reactor System will also achieve demetallization, denitrogenation, and a certain amount of ring opening hydrogenation of the complex aromatics and asphaltenes, however minimal hydrocracking of hydrocarbons should take place. The process conditions of hydrogen partial pressure, reaction pressure, temperature and residence time as measured by liquid hourly velocity are optimized to achieve desired final product quality. A more detailed discussion of the Reactor System, the structured catalyst beds, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (I) is sent OSBL via line (17c) for treatment.

The hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. We also assume a second draw (not shown) may be included to withdraw a distillate product, preferably a middle to heavy distillate. The vent stream (M) from the Oil Product Stripper in line (19a) may be sent to the fuel gas system or to the flare system that are OSBL. A more detailed discussion of the Oil Product Stripper System is contained in the "Oil Product Stripper System Description."

The gaseous components from the Cold Separator (F") in line (17a) contain a mixture of hydrogen, hydrogen sulfide and light hydrocarbons (mostly methane and ethane). This vapor stream (17a) feeds an Amine Absorber System (21) where it is contacted against Lean Amine (J) provided OSBL via line (21a) to the Amine Absorber System (21) to remove hydrogen sulfide from the gases making up the Activating Gas recycle stream (C'). Rich amine (K) which has absorbed hydrogen sulfide exits the bottom of the Amine Absorber System (21) and is sent OSBL via line (21b) for amine regeneration and sulfur recovery.

The Amine Absorber System overhead vapor in line (21c) is preferably recycled to the process as a Recycle Activating Gas (C') via the Recycle Compressor (23) and line (23a) where it is mixed with the Makeup Activating Gas (C") provided OSBL by line (23b). This mixture of Recycle Activating Gas (C') and Makeup Activating Gas (C") to form the Activating Gas (C) utilized in the process via line (23c) as noted above. A Scrubbed Purge Gas stream (H) is taken from the Amine Absorber System overhead vapor line (21c) and sent via line (21d) to OSBL to prevent the buildup of light hydrocarbons or other non-condensable hydrocarbons. A more detailed discussion of the Amine Absorber System is contained in the "Amine Absorber System Description."

Reactor System Description: The core process Reactor System (11) illustrated in FIG. 2 comprises a single reactor vessel loaded with the process catalyst and sufficient controls, valves and sensors as one of skill in the art would readily appreciate. One of skill in the art will appreciate that the reactor vessel itself must be engineered to withstand the pressures, temperatures and other conditions (i.e. presence of hydrogen and hydrogen sulfide) of the process. Using special alloys of stainless steel and other materials typical of such a unit are within the skill of one in the art and well known. As illustrated, one or more beds in the reactor vessel may be a structured catalyst bed or a fixed dense packed catalyst bed or combinations of these. A Reactor System containing at least reactor vessel with at least one structured catalyst bed is preferred as these are easier to operate and maintain, however other reactor types are also within the scope of the invention.

A description of the process catalyst, the selection of the process catalyst and the grading of the catalyst within the reactor vessel is contained in the "Catalyst in Reactor System".

Alternative configurations for the core process Reactor System (11) are contemplated. In one illustrative configuration, more than one reactor vessel may be utilized in parallel as shown in FIG. 3 to replace the core process Reactor System (11) illustrated in FIG. 2.

Figure 3:
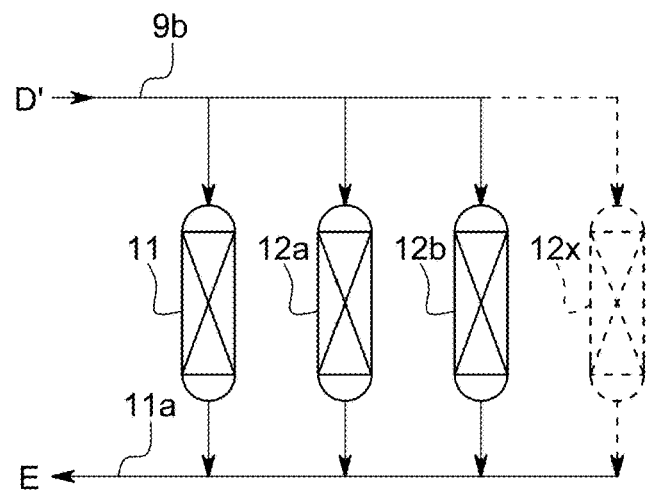
FIG. 3 is a process flow diagram of a first alternative configuration for the Reactor System (11) in FIG. 2.

In the embodiment in FIG. 3, each reactor vessel is loaded with process catalyst in a similar manner and each reactor vessel in the Reactor System is provided the heated Feed Mixture (D') via a common line 9b. The effluent from each reactor vessel in the Reactor System is recombined and forms a combined Reactor Effluent (E) for further processing as described above via line 11a. The illustrated arrangement will allow the three reactors to carry out the process effectively multiplying the hydraulic capacity of the overall Reactor System. Control valves and isolation valves may also prevent feed from entering one reactor vessel but not another reactor vessel. In this way one reactor can be by-passed and placed off-line for maintenance and reloading of catalyst while the remaining reactors continues to receive heated Feedstock Mixture (D'). It will be appreciated by one of skill in the art this arrangement of reactor vessels in parallel is not limited in number to three, but multiple additional reactor vessels can be added as shown by dashed line reactor. The only limitation to the number of parallel reactor vessels is plot spacing and the ability to provide heated Feedstock Mixture (D') to each active reactor.

Figure 4:
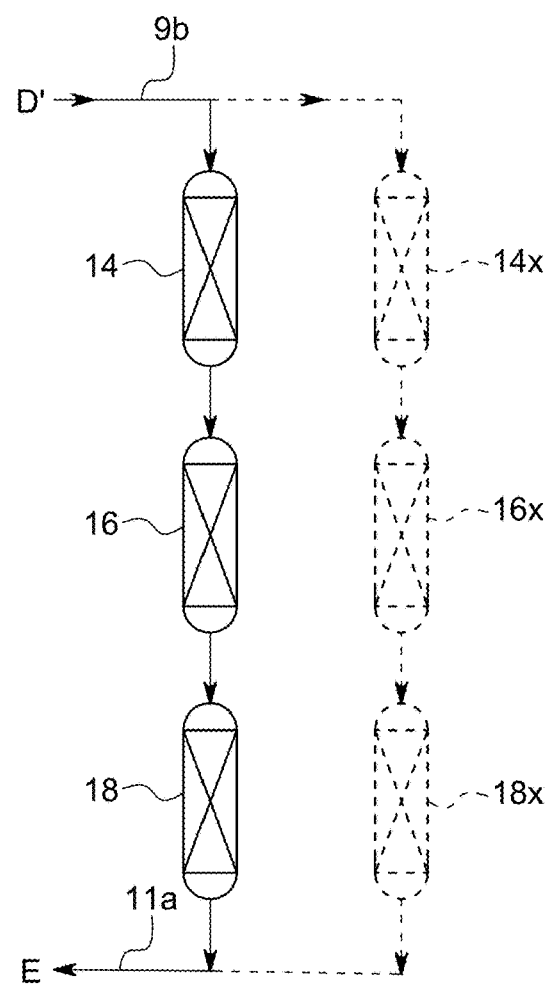
FIG. 4 is a process flow diagram of a second alternative configuration for the Reactor System (11) in FIG. 2.

A cascading series in FIG. 4 can also be substituted for the single reactor vessel Reactor System 11 in FIG. 2. The cascading reactor vessels are loaded with process catalyst with the same or different activities toward metals, sulfur or other environmental contaminates to be removed. For example, one reactor may be loaded with a highly active demetallization catalyst, a second subsequent or downstream reactor may be loaded with a balanced demetallization/desulfurizing catalyst, and reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and minimize the hydrocracking reactions.

Another illustrative embodiment of the replacement of the single reactor vessel Reactor System 11 in FIG. 2 is a matrix of reactors composed of interconnected reactors in parallel and in series. A simple 2×2 matrix arrangement of reactors with associated control valves and piping illustrates this embodiment, however a wide variety of matrix configurations such as 2×3; 3×3, etc. . . . are contemplated and within the scope of the present invention. A 2 reactor by 2 reactor (2×2) matrix of comprises four reactor vessels each with reactor inlet control valves and reactor outlet control valves associated with each vessel. Horizontal flow control valves regulate the flow across the matrix from heated Feedstock (D') in line 9b to discharging Reactor Effluent (E) into line 11a. Vertical flow control valves control the flow through the matrix from line 9b to line 11a. One of skill in the art will appreciate that control over the multiple valves and flow can be achieved using a computerized control system/distributed control system (DCS) or programmable logic controllers (PLC) programed to work with automatic motorized valve controls, position sensors, flow meters, thermocouples, etc. . . . . These systems are commercially available from vendors such as Honeywell International, Schneider Electric; and ABB. Such control systems will include lock-outs and other process safety control systems to prevent opening of valves in manner either not productive or unsafe.

One of skill in the art will quickly realize and appreciate that by opening and closing the valves and varying the catalyst loads present in each reactor, many configurations may be achieved. One such configuration would be to open valves and close other valves so the flow for heated Feed Mixture (D') will pass through the reactors in series. Another such configuration would be to open valves and close other valves so the flow of heated Feed Mixture (D') will pass through three of the reactors in series, but not the fourth. As with the prior example, the nature of the Feedstock HSFO and the catalyst loaded in each reactor and the presence or absence of structured catalyst beds may be optimized and adjusted to achieve the desired Product HSFO properties, however for brevity of disclose all such variations will be apparent to one of skill in the art.

One benefit of having a multi-reactor Reactor System is that it allows for a reactor that is experiencing decreased activity or plugging because of coke formation to be isolated and taken off line for turn-around (i.e. deactivated, catalyst and internals replaced, etc. . . . ) without the entire plant having to shut down. Another benefit as noted above is that it allows one to vary the catalyst loading in the Reactor System so the overall process can be optimized for a specific Feedstock HSFO. A further benefit is that one can design the piping, pumps, heaters/heat exchangers, etc. . . . to have excess capacity so that when an increase in capacity is desired, additional reactors can be quickly brought on-line. Conversely, it allows an operator to take capacity off line, or turn down a plant output without having a concern about turn down and minimum flow through a reactor. While the above matrix Reactor System is described referring to a fixed bed or packed bed trickle flow reactor, one of skill in the art will appreciate that other reactor types may be utilized. For example, one or more reactors may be configured to be ebullated bed up flow reactors or three phase upflow bubble reactors, or counter-current reactors, the configuration of which will be known to one of skill in the art. In a preferred embodiment, at least one reactor is configured to operate using structured catalyst beds and under reactive distillation configuration of the type disclosed. It is anticipated that many other operational and logistical benefits will be realized by one of skill in the art from the Reactor Systems configurations disclosed.

Structured Catalyst Bed Turning now to the structured catalyst bed, similar beds have been disclosed in the prior art in relation to many catalyst promoted reactions. See for example U.S. Pat. Nos. 4,731,229; 5,073,236; 5,266,546; 5,431,890; 5,730,843; US2002068026; US20020038066; US20020068026; US20030012711; US20060065578; US20070209966; US20090188837; US2010063334; US2010228063; US20110214979; US20120048778; US20150166908; US20150275105; 20160074824; 20170101592 and US20170226433, the contents of which are incorporated herein by reference. While some disclosures involved reactive distillations conditions, one of skill in the art will note these disclosures involve the product being distilled from heavier bottoms or feedstock materials. For example heavy and light naphtha streams are desulfurized with the desired light naphtha being the desired product for the gasoline pool and the heavy naphtha either recycled or sent to an FCC cracker for further upgrading. The process of the invention utilizes the reactive distillation process to remove undesired by-product hydrocarbons and gases produced by the catalytic reaction (i.e. ammonia and hydrogen sulfide) and the desired residual product is the bottoms stream that is catalytically treated, but not distilled. These aspects of the inventive concepts are disclosed in greater detail in the description of the Reactive Distillation Reactor below.

The structured catalyst beds as described above balance the catalyst density load, the catalyst activity load and the desired liquid space velocity through the reactor so an effective separation or distillation of purified lighter products can be produced. In contrast the present process functionally combines the functioning of a reactor with a stripper column or knock down drum. A further problem solved by the structured catalyst bed is to reduce the pressure drop through the catalyst beds and provision of sufficient contact of the Feedstock Mixture with the catalyst and mixing with the Activating Gas.

Figure 5:
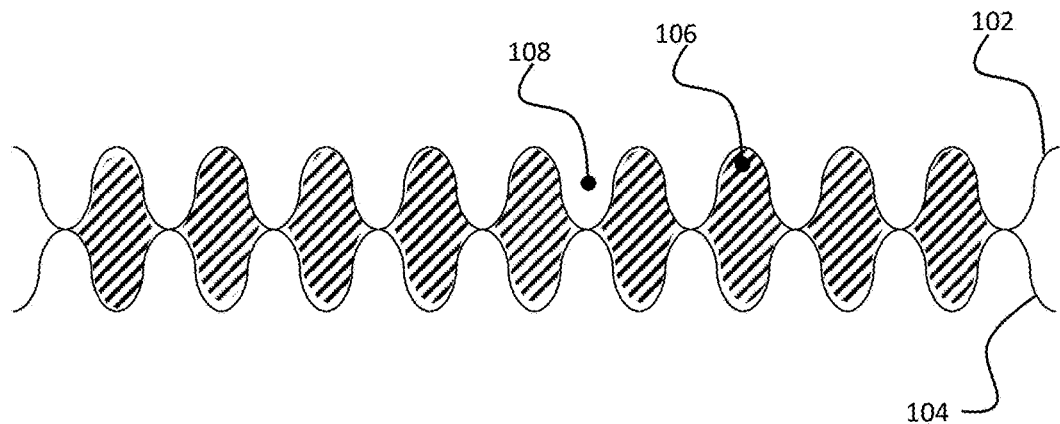
FIG. 5 is a side view of a catalyst retention structure component of a first illustrative embodiment of a structured catalyst bed.
Figure 6:
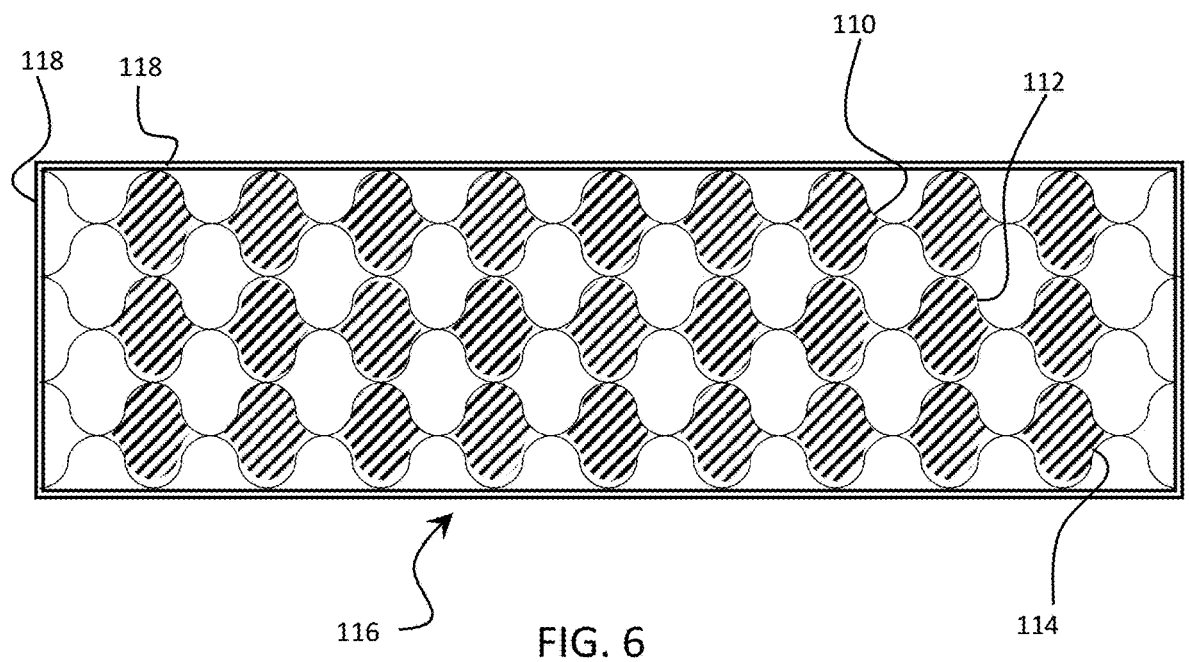
FIG. 6 is a side view of a first illustrative embodiment of a structured catalyst bed.

A first illustrative embodiment of the structured catalyst beds is shown in FIG. 5 and FIG. 6 in a side view. As illustrated in FIG. 5 is a catalyst retention structure composed of a pair of fluid permeable corrugated metal sheets (102 and 104), wherein the pair of the fluid permeable corrugated metal sheets are aligned so the corrugations are sinusoidal, have the same wave length and amplitude, but are out of phase and defining a catalyst rich space (106) and a catalyst lean space (108). The catalyst rich space will be loaded with one or more catalyst materials and optionally inert packing materials. The catalyst lean space (108) may be left empty or it may be loaded with inert packing such as ceramic beads, inactive (non-metal containing) catalyst support, glass beads, rings, wire or plastic balls and the like. These inert packing materials may serve the role of assisting in the mixing of the Activating Gas with the Feedstock HMFO, facilitate the removal or separation of gaseous by products (i.e. hydrogen sulfide or ammonia) from the process mixture or facilitate the separation of any hydrocarbon by-products.

FIG. 6 shows in side perspective a plurality of catalyst retention structures (110, 112 and 114) formed into a structured catalyst bed (116). Structural supports (118) may be optionally incorporated into the structured catalyst bed to lend rigidity as needed. As shown the catalyst rich spaces are radially aligned so the catalyst rich spaces of one catalyst retention structure is aligned with the catalyst rich structure of the adjacent layers. In the illustrated configuration, the radial angle between adjacent layers is 0° (or 180°). One of skill in the art will appreciate that the angle of radial alignment between adjacent layers may be varied from 0° to 180°, preferably between 20° and 160° and more preferably 90° so the catalyst rich areas in one layer are perpendicular to the adjacent layers. It will be further appreciated that the alignment of a particular set of three or more layers need not be the same. A first layer may be aligned along and define the 0° axis relative to the other two layers; a second adjacent layer may be radially aligned along a 45° angle relative to the first layer; and the third layer aligned along a 90° angle relative to the first layer. This pattern of alignment may be continued until the desired number of layers is achieved. It also should be appreciated that it may be desirable to angle of the catalyst rich spaces (i.e. the plane of the catalyst retention structure), relative to the flow of Feedstock HMFO and Activating Gas within the reaction vessel. This relative angle is referred to herein as the inclination angle. As shown in FIG. 6, the inclination angel is perpendicular (90°) to the flow of Feedstock HMFO and Activating Gas through the reactor vessel. However, it will be appreciated that the inclination level may be varied between 0°, in which case the catalyst rich spaces are vertically aligned with the side walls of the reactor vessel and 90° in which case the catalyst rich spaces are perpendicular to the side walls of the reactor vessel. By varying both the radial alignment and the inclination angle of the catalyst rich spaces, one can achieve a wide variety and be able to optimize the flow of Feedstock HMFO though the reactor vessel with minimal plugging/coking.

Figure 7:
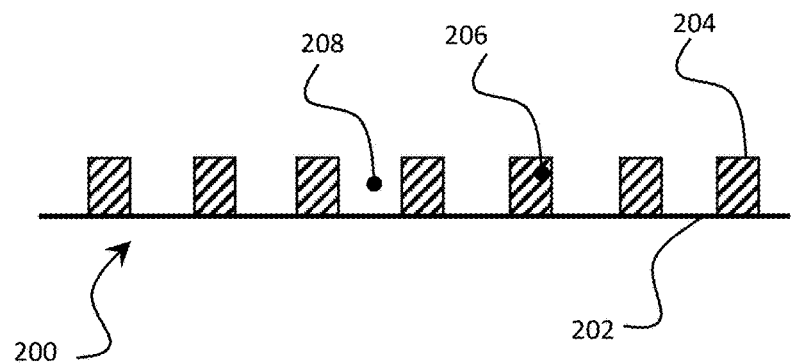
FIG. 7 is a side view of a catalyst retention structure component of a second illustrative embodiment of a structured catalyst bed.
Figure 8:
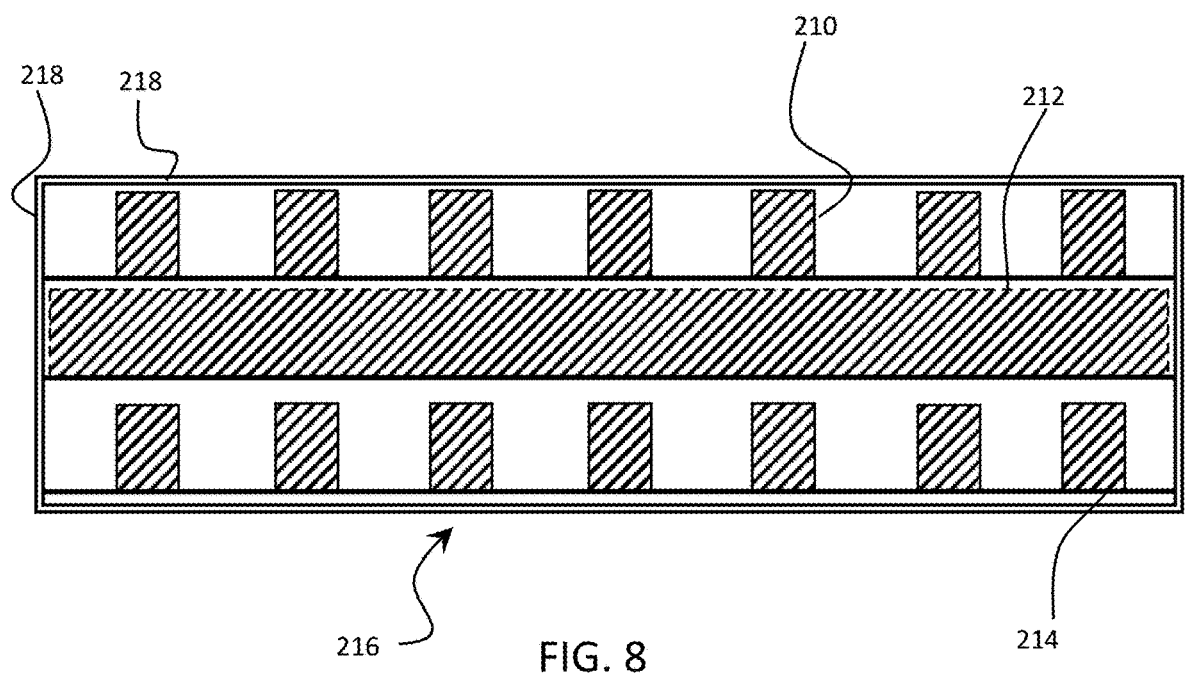
FIG. 8 is a side view of a second illustrative embodiment of a structured catalyst bed.

A second illustrative embodiment of the structured catalyst beds is shown in FIG. 7 and FIG. 8 in a side view. As illustrated in FIG. 7, catalyst retention structure (200) comprises a flat fluid permeable metal sheet (202) and a corrugated fluid permeable metal sheet (204) aligned to be co-planar and defining a catalyst rich space (206) and a catalyst lean space (208). As with the prior illustrative embodiment, the catalyst rich space will contain one or more catalyst materials and optionally inert packing materials and the catalyst lean space will be empty or optionally contain inert packing materials. FIG. 8 shows in side perspective a plurality of catalyst retention structures (210, 212 and 214) formed into a structured catalyst bed (216). Structural supports (218) may be optionally incorporated into the structured catalyst bed to lend rigidity as needed. As shown the catalyst rich spaces are radially aligned so the catalyst rich spaces of one catalyst retention structure is perpendicular with the catalyst rich structure of the adjacent layers. In the illustrated configuration, the radial angle between adjacent layers is 90°. The same considerations of radial alignment and inclination of the catalyst retention structures described above will apply to this embodiment. The principle benefit of the illustrated structured catalyst bed is that the manufacturing process because affixing the flat fluid permeable sheet and the corrugated fluid permeable sheet will be greatly simplified. Further as illustrated, if the corrugated sheet is constructed using 90° angle corrugations, each catalyst retention structure can withstand much greater weight loadings than if the corrugations are sinusoidal.

The loading of the catalyst structures will depend upon the particle size of the catalyst materials and the activity level of the catalyst. The structures should be loaded so the open space will be at least 10 volume % of the overall structural volume, and preferably will be up to about 65% of the overall structural volume. Active catalyst materials should be loaded in the catalyst support structure at a level dependent upon the catalyst activity level and the desired level of treatment. For example a catalyst material highly active for desulfurization may be loaded at a lower density than a less active desulfurization catalyst material and yet still achieve the same overall balance of catalyst activity per volume. One of skill in the art will appreciate that by systematically varying the catalyst loaded per volume and the catalyst activity level one may optimize the activity level and fluid permeability levels of the structured catalyst bed. In one such example, the catalyst density is such that over 50% of the open space in the catalyst rich space, which may occupy only have of the over space within the structured catalyst bed. In another example catalyst rich space is fully loaded (i.e. dense packed into each catalyst rich space), however the catalyst rich space may occupy only 30 volume % of the overall structured catalyst bed. It will be appreciated that the catalyst density in the catalyst rich space may vary between 30 vol % and 100 vol % of the catalyst rich space. It will be further appreciated that that catalyst rich space may occupy as little as 10 vol % of the overall structured catalyst bed or it may occupy as much as 80 vol % of the overall structured catalyst bed.

The liquid hourly space velocity within the structured catalyst beds should be between 0.05 oil/hour/m$^3$ catalyst and 10.0 oil/hour/m$^3$ catalyst; preferably between 0.08 oil/hour/m$^3$ catalyst and 5.0 oil/hour/m$^3$ catalyst and more preferably between 0.1 oil/hour/m$^3$ catalyst and 3.0 oil/hour/m$^3$ catalyst to achieve deep desulfurization using a highly active desulfurization catalyst and this will achieve a product with sulfur levels below 0.1 ppmw. However, it will be appreciated by one of skill in the art that when there is lower catalyst density, it may be desirable to adjust the space velocity to value outside of the values disclosed.

Figure 9:
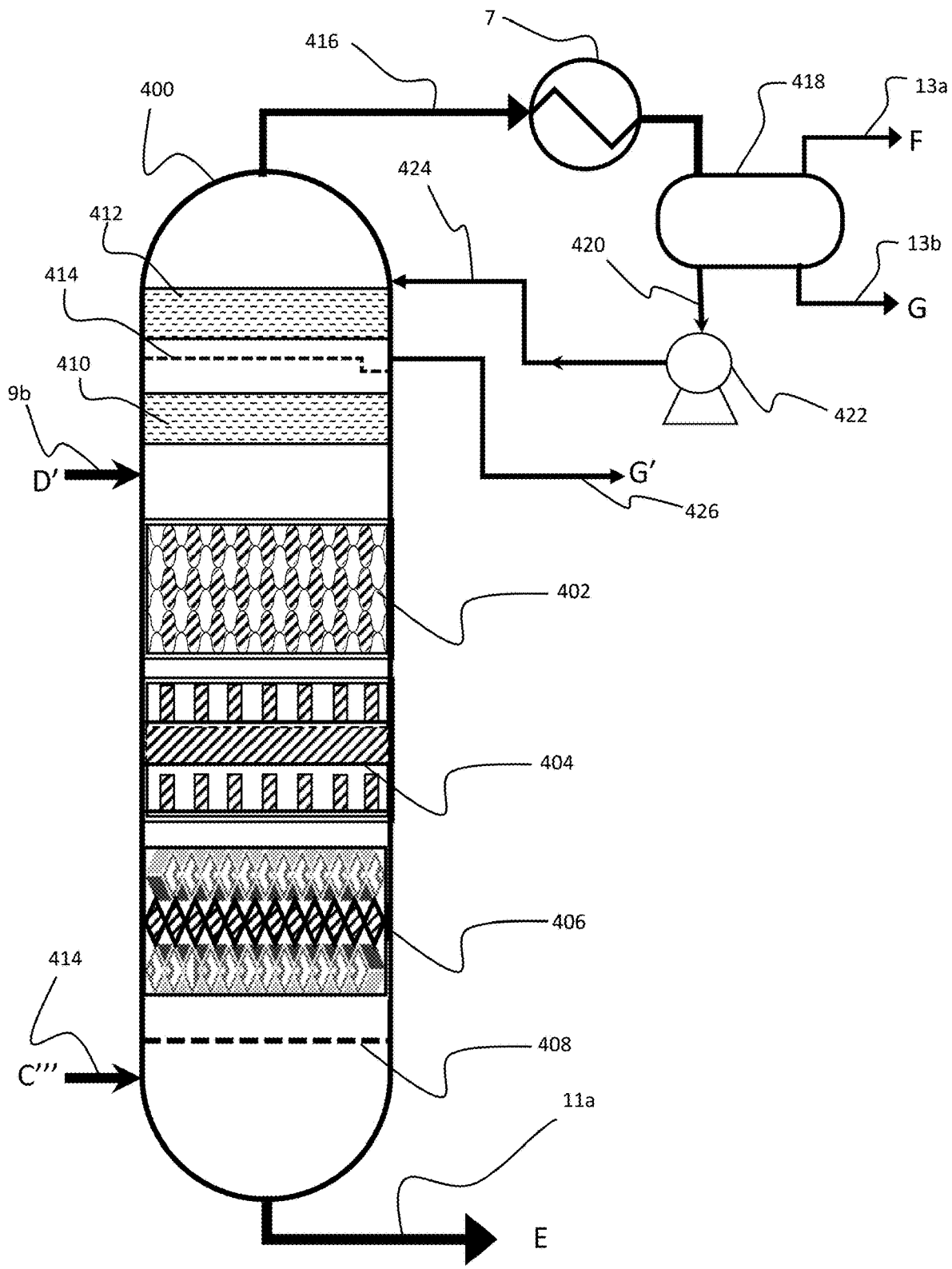
FIG. 9 illustrates a reaction vessel configured to operate under reactive distillation conditions.

Reactive Distillation Reactor As in FIG. 9, a reactive Reactor System as contemplated by the present invention will comprise a reactor vessel (400) within which one or more structured beds are provided (402, 404 and 406). One of skill in the art will note that heated Feedstock Mixture (D') enters the reactor vessel in the upper portion of the reactor via line (9b) above the structured catalyst beds (402, 404 and 406). When elements are the same as those previously disclosed, the same reference number is utilized for continuity within the disclosure. Entry of the heated Feedstock Mixture (D') above the structured catalyst beds (402, 404 and 406) may be facilitated by a distribution tray or similar device not shown. It will also be noted that each of the structured catalyst beds is different in appears, the reason for this will now described. The upper most structured catalyst bed (402) will be preferably loaded with a demetallization catalyst and in a structure optimized for the demetallization of the Feedstock mixture. The middle structured catalyst bed (404) will preferably be loaded with a transition catalyst material or a mixture of demetallization and low activity desulfurization catalyst. The lower most structured catalyst bed will be preferably loaded with a desulfurization catalyst of moderate to high activity. A gas sparger or separation tray (408) is below structured catalyst tray 406. In this way, the Feedstock Mixture flows from the upper portion of the reactor to the lower portion of the reactor and will be transformed into Reaction Mixture (E) which exits the bottom of the reactor via line 11a.

As shown, make up Activating Gas C''' will be provided via line 414 to both quench and create within the reactor a counter-current flow of Activating gas within the reactor. One of skill in the art will appreciate this flow may also be connected to the reactor so make up Activating gas is also injected between structured catalyst beds 406 and 404 and 404 and 402. In the upper portion of the reactor, inert distillation packing beds (410 and 412) may be located. It may be desirably and optionally it is preferable for the lower most upper beds (410) to be a structured catalyst bed as well with catalyst for the desulfurization of the distillate materials. In such an instance a liquid draw tray, or a downcomer tray or similar liquid diversion tray (414) is inserted so a flow of middle to heavy distillate (G') can be removed from the upper portion of the reactor via line (426). Light hydrocarbons (i.e. lighter than middle distillate exits the top of the reactor via line (416) and passes through heat exchanger (7) to help with heat recovery. This stream is then directed to the reflux drum (418) in which liquids are collected for use as reflux materials. The reflux loop to the upper reactor is completed via reflux pump (422) and reflux line (424). That portion of the lights not utilized in the reflux are combined with similar flows (F and G) via lines 13a and 13b respectively.

One of skill in the art of reactor design will note that unlike the prior art reactive distillation processes and reactor designs, the present invention presents multiple novel and non-obvious (i.e. inventive step) features. One such aspect the Feedstock Mixture enters the upper portion of the reactor above the structured catalytic beds. In doing so it is transformed into Reaction Mixture that exits the bottom of the reactor. One of skill in the art will appreciate that by this flow, the majority of HMFO material (which is characterized as being residual in nature) will not be volatile or distilled, but any byproduct gases, distillate hydrocarbons or light hydrocarbons are volatilized into the upper portion of the reactor. The reactor will be hydraulically designed so the majority of the volume of the liquid components having residual properties in the Feedstock Mixture will exit the lower portion of the reactor, preferably over 75% vol. of the volume of the liquid components having residual properties in the Feedstock Mixture will exit the lower portion of the reactor and even more preferably over 90% vol. of the volume of the liquid components having residual properties in the Feedstock Mixture will exit the lower portion of the reactor. This is in contract with the prior art where the majority of the desired products exit the upper portion of the reactor via distillation and the residual bottoms portions are recycled or sent to another refinery unit for further processing.

In a variation of the above illustrative embodiment, one or more fixed bed reactor(s) containing, solid particle filtering media such as inactive catalyst support, inert packing materials, selective absorption materials such as sulfur absorption media, demetallization catalyst or combinations and mixtures of these may be located upstream of the Reactive distillation reactor. In one alternative embodiment a reactor with a mixture of hydrodemetallization catalyst, decarbonization catalysts and inert materials will act as a guard bed, protecting the Reactive distillation reactor from high levels of metals, concarbon (CCR) and other contaminants that can reduce the run length of the Reactive distillation reactor. In another embodiment, the upstream reactors are loaded within inert packing materials and deactivated catalyst to remove solids followed by a reactor loaded within hydrodemetallization catalyst. One of skill in the art will appreciate these upstream reactors may allow the upstream reactors to be taken out of service and catalysts changed out without shutting down or affecting operation of the Reactive distillation reactor.

In another variation of the above illustrative embodiment in FIG. 9, a fired reboiler can be added to the lower portion of the reactive distillation reactor. Such a configuration would take a portion of the Reaction Mixture from the bottom of the reactor prior to its exit via line 11*a*, pass it through a pump and optionally a heater, and reintroduce the material into the reactor above tray 408 and preferably above the lowermost structured catalyst bed (406). The purpose of the reboiler will be to add or remove heat within the reactive distillation reactor, and will increase column traffic, because of this reboiler loop a temperature profile in the reactive distillation reactor will be controlled and more distillate product(s) may be taken. We assume severity in the column could be increased to increase the hydrocracking activity within the reactive distillation reactor increasing the distillate production. Because of the washing effect caused by refluxing Reaction Mixture back into the reactive distillation reactor, coking and fouling of catalysts should be minimized, allowing for extending run lengths.

Catalyst in Reactor System: Generally a reactor vessel in each Reactor System is loaded with one or more process catalysts, preferably within one or more structured beds. The selection of the catalyst system in each reactor vessel is a function of feedstock properties, product requirements and operating constraints and optimization of the process catalyst for the specific reactor and can be carried out by routine trial and error by one of ordinary skill in the art.

Within the scope of the present invention, the process catalyst(s) (also called catalyst materials) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co—Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. One of skill in the art knows that demetallization using a transition metal catalyst (such a CoMo or NiMo) is favored by catalysts with a relatively large surface pore diameter and desulfurization is favored by supports having a relatively small pore diameter. Generally the surface area for the catalyst material ranges from 200-300 m$^2$/g.

The systematic adjustment of pore size and surface area, and transition metal loadings activities to preferentially form a demetallization catalyst or a desulfurization catalyst are well known and routine to one of skill in the art.

The catalyst selection utilized within and for loading the Reactor System may be preferentially designed with a catalyst loading scheme that results in the Feedstock Mixture first contacting a catalyst bed that with a catalyst preferential to demetallization followed downstream by a bed of catalyst with mixed activity for demetallization and desulfurization followed downstream by a catalyst bed with high desulfurization activity. A bed of inert materials may be loaded as the first bed followed by a bed with high demetallization activity the two beds acting as a guard bed to minimize metal deposits on the subsequent the desulfurization beds.

The objective of the Reactor System is to treat the Feedstock HMFO at the severity required to meet the Product HMFO specification. Demetallization, denitrogenation and hydrocarbon hydrogenation reactions may also occur to some extent when the process conditions are optimized so the performance of the Reactor System achieves the required level of desulfurization. Hydrocracking is preferably minimized to reduce the volume of hydrocarbons formed as by-product hydrocarbons to the process. The objective of the process is to selectively remove the environmental contaminates from Feedstock HMFO and minimize the formation of unnecessary by-product hydrocarbons ($C_1$-$C_8$ hydrocarbons).

The process conditions in each reactor vessel will depend upon the feedstock, the catalyst utilized and the desired properties of the Product HMFO. Variations in conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900° F., preferably between 650° F. and 850° F. and more preferably between 680° F. and 800° F. The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_{H2}$) greater than 80% of the total pressure of the Activating Gas mixture (P) and preferably wherein the Activating Gas has an ideal gas partial pressure of hydrogen ($p_{H2}$) greater than 95% of the total pressure of the Activating Gas mixture (P). The Activating Gas may have a hydrogen mole fraction in the range between 80% of the total moles of Activating Gas mixture and more preferably wherein the Activating Gas has a hydrogen mole fraction between 80% and 99% of the total moles of Activating Gas mixture. The liquid hourly space velocity within the Reactor System should be between 0.05 oil/hour/m$^3$ catalyst and 1.0 oil/hour/m$^3$ catalyst; preferably between 0.08 oil/hour/m³ catalyst and 0.5 oil/hour/m³ catalyst and more preferably between 0.1 oil/hour/m³ catalyst and 0.3 oil/hour/m³ catalyst to achieve deep desulfurization with product sulfur levels below 0.1 ppmw.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System as described.

Oil Product Stripper System Description: The Oil Product Stripper System (19) comprises a stripper column (also known as a distillation column or exchange column) and ancillary equipment including internal elements and utilities required to remove hydrogen, hydrogen sulfide and light hydrocarbons lighter than diesel from the Product HMFO. Such systems are well known to one of skill in the art, see U.S. Pat. Nos. 6,640,161; 5,709,780; 5,755,933; 4,186,159; 3,314,879 3,844,898; 4,681,661; or U.S. Pat. No. 3,619,377 the contents of which are incorporated herein by reference, a generalized functional description is provided herein. Liquid from the Hot Separator (13) and Cold Separator (7) feed the Oil Product Stripper Column (19). Stripping of hydrogen and hydrogen sulfide and light hydrocarbons lighter than diesel may be achieved via a reboiler, live steam or other stripping medium. The Oil Product Stripper System (19) may be designed with an overhead system comprising an overhead condenser, reflux drum and reflux pump or it may be designed without an overhead system. The conditions of the Oil Product Stripper may be optimized to control the bulk properties of the Product HMFO, more specifically viscosity and density. It is also contemplated that a second draw (not shown) may be included to withdraw a distillate product, preferably a middle to heavy distillate.

Amine Absorber System Description: The Amine Absorber System (21) comprises a gas liquid contacting column and ancillary equipment and utilities required to remove sour gas (i.e. hydrogen sulfide) from the Cold Separator vapor feed so the resulting scrubbed gas can be recycled and used as Activating Gas. Because such systems are well known to one of skill in the art, see U.S. Pat. Nos. 4,425,317; 4,085,199; 4,080,424; 4,001,386; which are incorporated herein by reference, a generalized functional description is provided herein. Vapors from the Cold Separator (17) feed the contacting column/system (19). Lean Amine (or other suitable sour gas stripping fluids or systems) provided from OSBL is utilized to scrub the Cold Separator vapor so hydrogen sulfide is effectively removed. The Amine Absorber System (19) may be designed with a gas drying system to remove the any water vapor entrained into the Recycle Activating Gas (C'). The absorbed hydrogen sulfide is processed using conventional means OSBL in a tail gas treating unit, such as a Claus combustion sulfur recovery unit or sulfur recovery system that generates sulfuric acid.

These examples will provide one skilled in the art with a more specific illustrative embodiment for conducting the process disclosed and claimed herein:

Example 1

Overview: The purpose of a pilot test run is to demonstrate that feedstock HMFO can be processed through a reactor loaded with commercially available catalysts at specified conditions to remove environmental contaminates, specifically sulfur and other contaminants from the HMFO to produce a product HMFO that is MARPOL compliant, that is production of a Low Sulfur Heavy Marine Fuel Oil (LS-HMFO) or Ultra-Low Sulfur Heavy Marine Fuel Oil (USL-HMFO).

Pilot Unit Set Up: The pilot unit will be set up with two 434 cm³ reactors arranged in series to process the feedstock HMFO. The lead reactor will be loaded with a blend of a commercially available hydrodemetallization (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor will be loaded with a blend of the commercially available hydro-transition (HDT) and a commercially available hydrodesulfurization (HDS). One can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor will be loaded with ⅔ hydrodemetallization catalyst and ⅓ hydro-transition catalyst. The second reactor will be loaded with all hydrodesulfurization catalyst. The catalysts in each reactor will be mixed with glass beads (approximately 50% by volume) to improve liquid distribution and better control reactor temperature. For this pilot test run, one should use these commercially available catalysts: HDM: Albemarle KFR 20 series or equivalent; HDT: Albemarle KFR 30 series or equivalent; HDS: Albemarle KFR 50 or KFR 70 or equivalent. Once set up of the pilot unit is complete, the catalyst can be activated by sulfiding the catalyst using dimethyldisulfide (DMDS) in a manner well known to one of skill in the art.

Pilot Unit Operation: Upon completion of the activating step, the pilot unit will be ready to receive the feedstock HMFO and Activating Gas feed. For the present example, the Activating Gas can be technical grade or better hydrogen gas. The mixed Feedstock HMFO and Activating Gas will be provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure: 13.8 MPa(g) (2000 psig).

One of skill in the art will know that the rates and conditions may be systematically adjusted and optimized depending upon feed properties to achieve the desired product requirements. The unit will be brought to a steady state for each condition and full samples taken so analytical tests can be completed. Material balance for each condition should be closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%.

Process conditions in the Pilot Unit can be systematically adjusted as per Table 1 to assess the impact of process conditions and optimize the performance of the process for the specific catalyst and feedstock HMFO utilized.

TABLE 1

Optimization of Process Conditions

| Case | HC Feed Rate (ml/h), [LHSV(/h)] | Nm³ H₂/m³ oil/scf H₂/bbl oil | Temp (° C./° F.) | Pressure (MPa(g)/psig) |
|---|---|---|---|---|
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the pilot unit can be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 Nm³/m³ (3480 scf/bbl); Reactor Temperature: 385° C. (725° F.); Reactor Outlet Pressure: 15 MPa(g) (2200 psig)

Table 2 summarizes the anticipated impacts on key properties of HMFO.

TABLE 2

Expected Impact of Process on Key Properties of HMFO

| Property | Minimum | Typical | Maximum |
|---|---|---|---|
| Sulfur Conversion/Removal | 80% | 90% | 98% |
| Metals Conversion/Removal | 80% | 90% | 100% |
| MCR Reduction | 30% | 50% | 70% |
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 3 lists analytical tests to be carried out for the characterization of the Feedstock HMFO and Product HMFO. The analytical tests include those required by ISO for the Feedstock HMFO and the product HMFO to qualify and trade in commerce as ISO compliant residual marine fuels. The additional parameters are provided so that one skilled in the art can understand and appreciate the effectiveness of the inventive process.

TABLE 3

Analytical Tests and Testing Procedures

| | |
|---|---|
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |
| Pour Point, ° C. | ISO 3016 |
| Flash Point, ° C. | ISO 2719 |
| CCAI | ISO 8217, ANNEX B |
| Ash Content | ISO 6245 |
| Total Sediment - Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 (unless indicated otherwise) |
| Vanadium | |
| Sodium | or ISO 14597 |
| Aluminum | or ISO 10478 |
| Silicon | or ISO 10478 |
| Calcium | or IP 500 |
| Zinc | or IP 500 |
| Phosphorous | IP 500 |
| Nickle | |
| Iron | |
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 4 contains the Feedstock HMFO analytical test results and the Product HMFO analytical test results expected from the inventive process that indicate the production of a LS HMFO. It will be noted by one of skill in the art that under the conditions, the levels of hydrocarbon cracking will be minimized to levels substantially lower than 10%, more preferably less than 5% and even more preferably less than 1% of the total mass balance.

TABLE 4

Analytical Results

| | Feedstock HMFO | Product HMFO |
|---|---|---|
| Sulfur Content, mass % | 3.0 | 0.3 |
| Density @ 15° C., kg/m³ | 990 | 950 [1] |
| Kinematic Viscosity @ 50° C., mm²/s | 380 | 100 [1] |
| Pour Point, ° C. | 20 | 10 |
| Flash Point, ° C. | 110 | 100 [1] |
| CCAI | 850 | 820 |
| Ash Content, mass % | 0.1 | 0.0 |
| Total Sediment - Aged, mass % | 0.1 | 0.0 |
| Micro Carbon Residue, mass % | 13.0 | 6.5 |
| H2S, mg/kg | 0 | 0 |
| Acid Number, mg KO/g | 1 | 0.5 |
| Water, vol % | 0.5 | 0 |
| Specific Contaminants, mg/kg | | |
| Vanadium | 180 | 20 |
| Sodium | 30 | 1 |
| Aluminum | 10 | 1 |
| Silicon | 30 | 3 |
| Calcium | 15 | 1 |
| Zinc | 7 | 1 |
| Phosphorous | 2 | 0 |
| Nickle | 40 | 5 |
| Iron | 20 | 2 |
| Distillation, ° C./° F. | | |
| IBP | 160/320 | 120/248 |
| 5% wt | 235/455 | 225/437 |
| 10% wt | 290/554 | 270/518 |
| 30% wt | 410/770 | 370/698 |
| 50% wt | 540/1004 | 470/878 |
| 70% wt | 650/1202 | 580/1076 |
| 90% wt | 735/1355 | 660/1220 |
| FBP | 820/1508 | 730/1346 |
| C:H Ratio (ASTM D3178) | 1.2 | 1.3 |
| SARA Analysis | | |
| Saturates | 16 | 22 |
| Aromatics | 50 | 50 |
| Resins | 28 | 25 |
| Asphaltenes | 6 | 3 |
| Asphaltenes, wt % | 6.0 | 2.5 |
| Total Nitrogen, mg/kg | 4000 | 3000 |

Note:
[1] property will be adjusted to a higher value by post process removal of light material via distillation or stripping from product HMFO.

The product HMFO produced by the inventive process will reach ULS HMFO limits (i.e. 0.1% wt. sulfur product HMFO) by systematic variation of the process parameters, for example by a lower space velocity or by using a Feedstock HMFO with a lower initial sulfur content.

Example 2: RMG-380 HMFO

Pilot Unit Set Up: A pilot unit was set up as noted above in Example 1 with these changes: the first reactor was loaded with: as the first (upper) layer encountered by the feedstock 70% vol Albemarle KFR 20 series hydrodemetallization catalyst and 30% vol Albemarle KFR 30 series hydrotransition catalyst as the second (lower) layer. The second reactor was loaded with 20% Albemarle KFR 30 series hydrotransition catalyst as the first (upper) layer and 80% vol hydrodesulfurization catalyst as the second (lower) layer. The catalyst was activated by sulfiding the catalyst with dimethyldisulfide (DMDS) in a manner well known to one of skill in the art.

Pilot Unit Operation: Upon completion of the activating step, the pilot unit was ready to receive the feedstock HMFO and Activating Gas feed. The Activating Gas was technical grade or better hydrogen gas. The Feedstock HMFO was a commercially available and merchantable ISO 8217 (2017) compliant HMFO, except for a high sulfur content (2.9 wt %). The mixed Feedstock HMFO and Activating Gas was provided to the pilot plant at rates and conditions as specified in Table 5 below. The conditions were varied to optimize the level of sulfur in the product HMFO material.

TABLE 5

Process Conditions

| Case | HC Feed Rate (ml/h), [LHSV(/h)] | $Nm^3$ $H_2/m^3$ oil/scf $H_2$/bbl oil | Temp (° C./° F.) | Pressure (MPa(g)/psig) | Product HMFO Sulfur % wt. |
|---|---|---|---|---|---|
| Baseline | 108.5 [0.25] | 570/3200 | 371/700 | 13.8/2000 | 0.24 |
| T1 | 108.5 [0.25] | 570/3200 | 362/684 | 13.8/2000 | 0.53 |
| T2 | 108.5 [0.25] | 570/3200 | 382/720 | 13.8/2000 | 0.15 |
| L1 | 130.2 [0.30] | 570/3200 | 372/702 | 13.8/2000 | 0.53 |
| S1 | 65.1 [0.15] | 620/3480 | 385/725 | 15.2/2200 | 0.10 |
| P1 | 108.5 [0.25] | 570/3200 | 371/700 | /1700 | 0.56 |
| T2/P1 | 108.5 [0.25] | 570/3200 | 382/720 | /1700 | 0.46 |

Analytical data for a representative sample of the feedstock HMFO and representative samples of product HMFO are below:

TABLE 6

Analytical Results - HMFO (RMG-380)

|  | Feedstock | Product | Product |
|---|---|---|---|
| Sulfur Content, mass % | 2.9 | 0.3 | 0.1 |
| Density @ 15° C., kg/m³ | 988 | 932 | 927 |
| Kinematic Viscosity @ 50° C., mm²/s | 382 | 74 | 47 |
| Pour Point, ° C. | −3 | −12 | −30 |
| Flash Point, ° C. | 116 | 96 | 90 |
| CCAI | 850 | 812 | 814 |
| Ash Content, mass % | 0.05 | 0.0 | 0.0 |
| Total Sediment - Aged, mass % | 0.04 | 0.0 | 0.0 |
| Micro Carbon Residue, mass % | 11.5 | 3.3 | 4.1 |
| H2S, mg/kg | 0.6 | 0 | 0 |
| Acid Number, mg KO/g | 0.3 | 0.1 | >0.05 |
| Water, vol % | 0 | 0.0 | 0.0 |
| Specific Contaminants, mg/kg | | | |

TABLE 6-continued

Analytical Results - HMFO (RMG-380)

|  | Feedstock | Product | Product |
|---|---|---|---|
| Vanadium | 138 | 15 | <1 |
| Sodium | 25 | 5 | 2 |
| Aluminum | 21 | 2 | <1 |
| Silicon | 16 | 3 | 1 |
| Calcium | 6 | 2 | <1 |
| Zinc | 5 | <1 | <1 |
| Phosphorous | <1 | 2 | 1 |
| Nickle | 33 | 23 | 2 |
| Iron | 24 | 8 | 1 |
| Distillation, ° C./° F. | | | |
| IBP | 178/352 | 168/334 | 161/322 |
| 5% wt | 258/496 | 235/455 | 230/446 |
| 10% wt | 298/569 | 270/518 | 264/507 |
| 30% wt | 395/743 | 360/680 | 351/664 |
| 50% wt | 517/962 | 461/862 | 439/822 |
| 70% wt | 633/1172 | 572/1062 | 552/1026 |
| 90% wt | >720/>1328 | 694/1281 | 679/1254 |
| FBP | >720/>1328 | >720/>1328 | >720/>1328 |
| C:H Ratio (ASTM D3178) | 1.2 | 1.3 | 1.3 |
| SARA Analysis | | | |
| Saturates | 25.2 | 28.4 | 29.4 |
| Aromatics | 50.2 | 61.0 | 62.7 |
| Resins | 18.6 | 6.0 | 5.8 |
| Asphaltenes | 6.0 | 4.6 | 2.1 |
| Asphaltenes, wt % | 6.0 | 4.6 | 2.1 |
| Total Nitrogen, mg/kg | 3300 | 1700 | 1600 |

In Table 6, both feedstock HMFO and product HMFO exhibited observed bulk properties consistent with ISO 8217 (2017) for a merchantable residual marine fuel oil, except that the sulfur content of the product HMFO was reduced as noted above when compared to the feedstock HMFO.

One of skill in the art will appreciate that the above product HMFO produced by the inventive process has achieved not only an ISO 8217 (2017) compliant LS HMFO (i.e. 0.5% wt. sulfur) but also an ISO 8217 (2017) compliant ULS HMFO limits (i.e. 0.1% wt. sulfur) product HMFO.

Example 3: RMK-500 HMFO

The feedstock to the pilot reactor utilized in example 2 above was changed to a commercially available and merchantable ISO 8217 (2017) RMK-500 compliant HMFO, except that it has high environmental contaminates (i.e. sulfur (3.3 wt %)). Other bulk characteristic of the RMK-500 feedstock high sulfur HMFO are provide below:

TABLE 7

Analytical Results- Feedstock HMFO (RMK-500)

| Sulfur Content, mass % | 3.3 |
|---|---|
| Density @ 15° C., kg/m³ | 1006 |
| Kinematic Viscosity @ 50° C., mm²/s | 500 |

The mixed Feedstock (RMK-500) HMFO and Activating Gas was provided to the pilot plant at rates and conditions and the resulting sulfur levels achieved in the table below

TABLE 8

Process Conditions

| Case | HC Feed Rate (ml/h), [LHSV(/h)] | Nm³ H₂/m³ oil/scf H₂/bbl oil | Temp (° C./° F.) | Pressure (MPa(g)/psig) | Product (RMK-500) sulfur % wt. |
|------|----|----|----|----|----|
| A | 108.5 [0.25] | 640/3600 | 377/710 | 13.8/2000 | 0.57 |
| B | 95.5 [0.22] | 640/3600 | 390/735 | 13.8/2000 | 0.41 |
| C | 95.5 [0.22] | 640/3600 | 390/735 | 11.7/1700 | 0.44 |
| D | 95.5 [0.22] | 640/3600 | 393/740 | 10.3/1500 | 0.61 |
| E | 95.5 [0.22] | 640/3600 | 393/740 | 17.2/2500 | 0.37 |
| F | 95.5 [0.22] | 640/3600 | 393/740 | 8.3/1200 | 0.70 |
| G | 95.5 [0.22] | 640/3600 | 416/780 | 8.3/1200 | |

The resulting product (RMK-500) HMFO exhibited observed bulk properties consistent with the feedstock (RMK-500) HMFO, except that the sulfur content was reduced as noted in the above table.

One of skill in the art will appreciate that the above product HMFO produced by the inventive process has achieved a LS HMFO (i.e. 0.5% wt. sulfur) product HMFO having bulk characteristics of a ISO 8217 (2017) compliant RMK-500 residual fuel oil. It will also be appreciated that the process can be successfully carried out under non-hydrocracking conditions (i.e. lower temperature and pressure) that substantially reduce the hydrocracking of the feedstock material. When conditions were increased to much higher pressure (Example E) a product with a lower sulfur content was achieved, however some observed that there was an increase in light hydrocarbons and wild naphtha production.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it should cover modifications within the scope of the inventive concepts as defined by the claims.

The invention claimed is:

1. A process for the production of a Product Heavy Marine Fuel Oil, the process comprising: mixing a quantity of Feedstock Heavy Marine Fuel Oil, wherein Feedstock Heavy Marine Fuel Oil complies with ISO 8217 (2017) but has a sulfur content (ISO 14596 or ISO 8754) greater than 0.5% wt. with a quantity of Activating Gas mixture to give a Feedstock Mixture; contacting the Feedstock Mixture with one or more catalysts under reactive distillation conditions in a reactor to promote the formation of a Process Mixture from said Feedstock Mixture, wherein said Process Mixture comprises a bulk gaseous component, a by-product hydrocarbon component and a Product Heavy Marine Fuel Oil hydrocarbon component; and wherein said one or more catalysts are in the form of a structured catalyst bed; and wherein the reactive distillation conditions in the reactor substantially separate the bulk gaseous component and the by-product hydrocarbon component of the Process Mixture from the Product Heavy Marine Fuel Oil hydrocarbon component of the Process Mixture; discharging the Product Heavy Marine Fuel Oil hydrocarbon component of the Process Mixture from the reactor, wherein the Product Heavy Marine Fuel Oil component of the Process Mixture is greater than 75% by volume of the Feedstock Heavy Marine Fuel Oil and wherein and receiving the Product Heavy Marine Fuel Oil hydrocarbon component of the Process Mixture, wherein the Product Heavy Marine Fuel Oil hydrocarbon component of the Process Mixture comprises a entrained gaseous component, a entrained by-product hydrocarbon components and Product Heavy Marine Fuel Oil, and separating the entrained gaseous component and the entrained by-product hydrocarbon component from the Product Heavy Marine Fuel Oil component, and discharging the Product Heavy Marine Fuel Oil.

2. The process of claim 1, wherein the structured catalyst bed comprises a plurality of catalyst retention structures, each catalyst retention structure composed of a pair of fluid permeable corrugated metal sheets, wherein the pair of the fluid permeable corrugated metal sheets are aligned such that the corrugations are out of phase and thereby defining a catalyst rich space and a catalyst lean space within the structured catalyst bed, wherein within the catalyst rich space there is one or more catalyst materials and optionally inert packing materials.

3. The process of claim 1, wherein the structured catalyst bed contains one or more catalysts to promote the transformation of the Feedstock mixture to a Process Mixture wherein the structured catalyst bed comprises a plurality of catalyst retention structures, each catalyst retention structure composed of a pair of fluid permeable corrugated metal sheets, wherein the pair of the fluid permeable corrugated metal sheets are aligned such that the corrugations are out of phase and thereby defining a catalyst rich space and a catalyst lean space within the structured catalyst bed, wherein within the catalyst rich space there is one or more catalyst materials and optionally inert packing materials.

4. The process of claim 1 wherein the Product Heavy Marine Fuel Oil complies with ISO 8217 (2017) and has a sulfur content (ISO 14596 or ISO 8754) between the range of 0.50 mass % to 0.05 mass %.

5. The process of claim 4, wherein said Feedstock Heavy Marine Fuel Oil has: a of kinematic viscosity at 50° C. (ISO 3104) in the range from 180 mm²/s to 700 mm²/s; a density at 15° C. (ISO 3675) in the range of 991.0 kg/m³ to 1010.0 kg/m³; a CCAI in the range of 780 to 870; a flash point (ISO 2719) no lower than 60° C.; a total sediment—aged (ISO 10307-2) of less than 0.10 mass %; a carbon residue—micro method (ISO 10370) less than 20 mass %; and an aluminum plus silicon (ISO 10478) content less than 60 mg/kg.

6. The process of claim 4, wherein said Product Heavy Marine Fuel Oil has: a kinematic viscosity at 50° C. (ISO 3104) in the range from 180 mm²/s to 700 mm²/s; a density at 15° C. (ISO 3675) in the range of 991.0 kg/m³ to 1010.0 kg/m³; a CCAI in the range of 780 to 870; a flash point (ISO 2719) no lower than 60° C.; a total sediment—aged (ISO 10307-2) of less than 0.10 mass %; a carbon residue—micro method (ISO 10370) less than 20 mass %; and an aluminum plus silicon (ISO 10478) content less than 60 mg/kg.

7. The process of claim 1 wherein the catalyst materials comprises: a porous inorganic oxide catalyst carrier and a transition metal catalyst, wherein the porous inorganic oxide catalyst carrier is at least one carrier selected front the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

8. The process of claim 1, wherein the reactive distillation conditions comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500° F. to 900° F., and, wherein the liquid hourly space velocity is between 0.05 oil/hour/m$^3$ catalyst and 1.0 oil/hour/m$^3$ catalyst.

9. The process of claim 1, wherein the structured catalyst bed comprises a plurality of catalyst retention structures, each catalyst retention structure composed of a pair of fluid permeable corrugated metal sheets, wherein the pair of the fluid permeable corrugated metal sheets are aligned such that the corrugations are out of phase and thereby defining a catalyst rich space and a catalyst lean space within the structured catalyst bed, wherein within the catalyst rich space there is one or more catalyst materials and optionally inert packing materials.

10. The process of claim 1, wherein the structured catalyst bed contains one or more catalysts to promote the transformation of the Feedstock mixture to a Process Mixture wherein the structured catalyst bed comprises a plurality of catalyst retention structures, each catalyst retention structure composed of a pair of fluid permeable corrugated metal sheets, wherein the pair of the fluid permeable corrugated metal sheets are aligned such that the corrugation are out of phase and thereby defining a catalyst rich space and a catalyst lean space within the structured catalyst bed, wherein within the catalyst rich space there is one or more catalyst materials and optionally inert packing materials.

11. The process of claim 1, wherein the catalyst materials comprises: a porous inorganic oxide catalyst carrier and a transition metal catalyst, wherein the porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

12. The process of claim 1, wherein the reactive distillation conditions comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500° F. to 900° F., and, wherein the liquid hourly space velocity is between 0.05 oil/hour/m$^3$ catalyst and 1.0 oil/hour/m$^3$ catalyst.

13. A process for the production of a Product Heavy Marine Fuel Oil, the process comprising: mixing a quantity of Feedstock Heavy Marine Fuel Oil with a quantity of Activating Gas mixture to give a Feedstock Mixture, wherein the Feedstock Heavy Marine Fuel Oil complies with ISO 8217 (2017) except for the environmental contaminates, wherein the environmental contaminates are selected from the group consisting of: sulfur (ISO 14596 or ISO 8754); aluminum (ISO 10478); silicon (ISO 10478); nitrogen (ASTM D5762); vanadium content (ISO 14597), iron, nickel, calcium (IP 500), phosphorous (IP 500), and combinations thereof; and wherein the environmental contaminates have a cumulative concentration between the range of 5.0 wt % to 0.50 wt %; contacting the Feedstock Mixture with one or more supported transition metal catalysts in a reactor vessel under reactive distillation conditions to promote the formation of a Process Mixture comprised of a by-product gases component, a liquid by product hydrocarbon component, and a Reaction Mixture component from said Feedstock Mixture, and wherein the reactive distillation conditions in the reactor vessel volatilize the by-product gases component, and the liquid by-product hydrocarbon component of the Process Mixture so that the by-product gases component, and the liquid by-product hydrocarbon component of the Process Mixture exit from the top of the reactor vessel, and wherein the Reaction Mixture is at least 75% volume of the Feedstock Heavy Marine Fuel Oil, exits the bottom of the reactor vessel, and wherein said one or more supported transition metal catalysts in the reactor vessel are in the form of a structured catalyst bed, and; receiving said Reaction Mixture from the reactor vessel in a second vessel to form the Product Heavy Marine Fuel Oil, wherein the Product Heavy Marine Fuel Oil complies with ISO 8217 (2017) and has a sulfur content (ISO 14596 or ISO 8754) between the range of 0.50 mass % to 0.05 mass %.

14. The process of claim 13, wherein the Reaction Mixture is greater than 90% by volume of the Feedstock Heavy Marine Fuel Oil.

15. The process of claim 13 wherein the one or more catalyst materials comprises: a porous inorganic oxide catalyst carrier and a transition metal catalyst, wherein the porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6,8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

16. The process of claim 15, wherein the structured catalyst bed comprises a plurality of catalyst retention structures, each catalyst retention structure composed of a pair of fluid permeable corrugated metal sheets, wherein the pair of the fluid permeable corrugated metal sheets are aligned such that the corrugations are out of phase and thereby defining a catalyst rich space and a catalyst lean space within the structured catalyst bed, wherein within the catalyst rich space there is one or more catalyst materials and optionally inert packing materials.

17. The process of claim 13, wherein the reactive distillation conditions comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500° F. to 900° F., and, wherein the liquid hourly space velocity is between 0.05 oil/hour/m$^3$ catalyst and 1.0 oil/hour/m$^3$ catalyst.

18. The process of claim 13, wherein said Feedstock Heavy Marine Fuel Oil has: a of kinematic viscosity at 50°

C. (ISO 3104) in the range from 1.80 mm$^2$/s to 700 mm$^2$/s; a density at 15° C. (ISO 3675) in the range of 991.0 kg/m$^3$ of to 1010.0 kg/m$^3$; a CCAI in the range of 780 to 870; a flash point (ISO 2719) no lower than 60° C.; a total sediment—aged (ISO 10307-2) of less than 0.10 mass %; a carbon residue—micro method (ISO 10370) less than 20 mass %; and an aluminum plus silicon (ISO 10478) content less than 60 mg/kg.

19. The process of claim 13, wherein said Product Heavy Marine Fuel Oil has: a kinematic viscosity at 50° C. (ISO 3104) in the range from 180 mm$^2$/s to 700 mm$^2$/s; a density at 15° C. (ISO 3675) in the range of 991.0 kg/m$^3$ to 1010.0 kg/m$^3$; a CCAI in the range of 780 to 870; a flash point (ISO 2719) no lower than 60° C.; a total sediment—aged (ISO 10307-2) of less than 0.10 mass %; a carbon residue—micro method (ISO 10370) less than 20 mass %; and an aluminum plus silicon (ISO 10478) content less than 60 mg/kg.

* * * * *